Jan. 10, 1967  M. H. ARTAUD ETAL  3,297,379

FILE SELECTOR

Filed Nov. 12, 1964  8 Sheets-Sheet 1

| Table I | | | | | | Table II | | | | | |
|---|---|---|---|---|---|---|---|---|---|---|---|
| Distance from Left Edge (In Compartment Width) | | | | | | Distance from Bottom (In Compartment Heights) | | | | | |
| 44&45 | 43 | 42 | 41 | | | 65 | 64 | 63 | 62 | 61 | |
| 0 | 0 | 0 | 0 | 0 | | 0 | 0 | 0 | 0 | 0 | 0 |
| 1W | 0 | 0 | 0 | 1 | | 0 | 0 | 0 | 0 | 1 | 1H |
| 2W | 0 | 0 | 1 | 0 | | 0 | 0 | 0 | 1 | 0 | 2H |
| 3W | 0 | 0 | 1 | 1 | | 0 | 0 | 0 | 1 | 1 | 3H |
| 4W | 0 | 1 | 0 | 0 | | 0 | 0 | 1 | 0 | 0 | 4H |
| 5W | 0 | 1 | 0 | 1 | | 0 | 0 | 1 | 0 | 1 | 5H |
| 6W | 0 | 1 | 1 | 0 | | 0 | 0 | 1 | 1 | 0 | 6H |
| 7W | 0 | 1 | 1 | 1 | B.C. Home | | 0 | 0 | 1 | 1 | 1 | 7H |
| 8W | 1 | 0 | 0 | 1 | | 0 | 1 | 0 | 0 | 0 | 8H |
| 9W | 1 | 0 | 1 | 0 | | 0 | 1 | 0 | 0 | 1 | 9H |
| 10W | 1 | 0 | 1 | 1 | | 0 | 1 | 0 | 1 | 0 | 10H |
| 11W | 1 | 1 | 0 | 0 | | 0 | 1 | 0 | 1 | 1 | 11H |
| 12W | 1 | 1 | 0 | 1 | | 0 | 1 | 1 | 0 | 0 | 12H |
| 13W | 1 | 1 | 1 | 0 | | 0 | 1 | 1 | 0 | 1 | 13H |
| 14W | 1 | 1 | 1 | 1 | | 0 | 1 | 1 | 1 | 0 | 14H |
| | | | | | | 0 | 1 | 1 | 1 | 1 | 15H |
| | | | | | | 1 | 1 | 0 | 1 | 1 | 16H |
| | | | | | | 1 | 1 | 1 | 0 | 0 | 17H |
| | | | | | | 1 | 1 | 1 | 0 | 1 | 18H |
| | | | | | | 1 | 1 | 1 | 1 | 0 | 19H |
| | | | | | | 1 | 1 | 1 | 1 | 1 | 20H |

INVENTORS:
Maurice H. Artaud
Robert L. Laurent
William E. Roberts

By Smyth, Roston & Pavitt
Attorneys

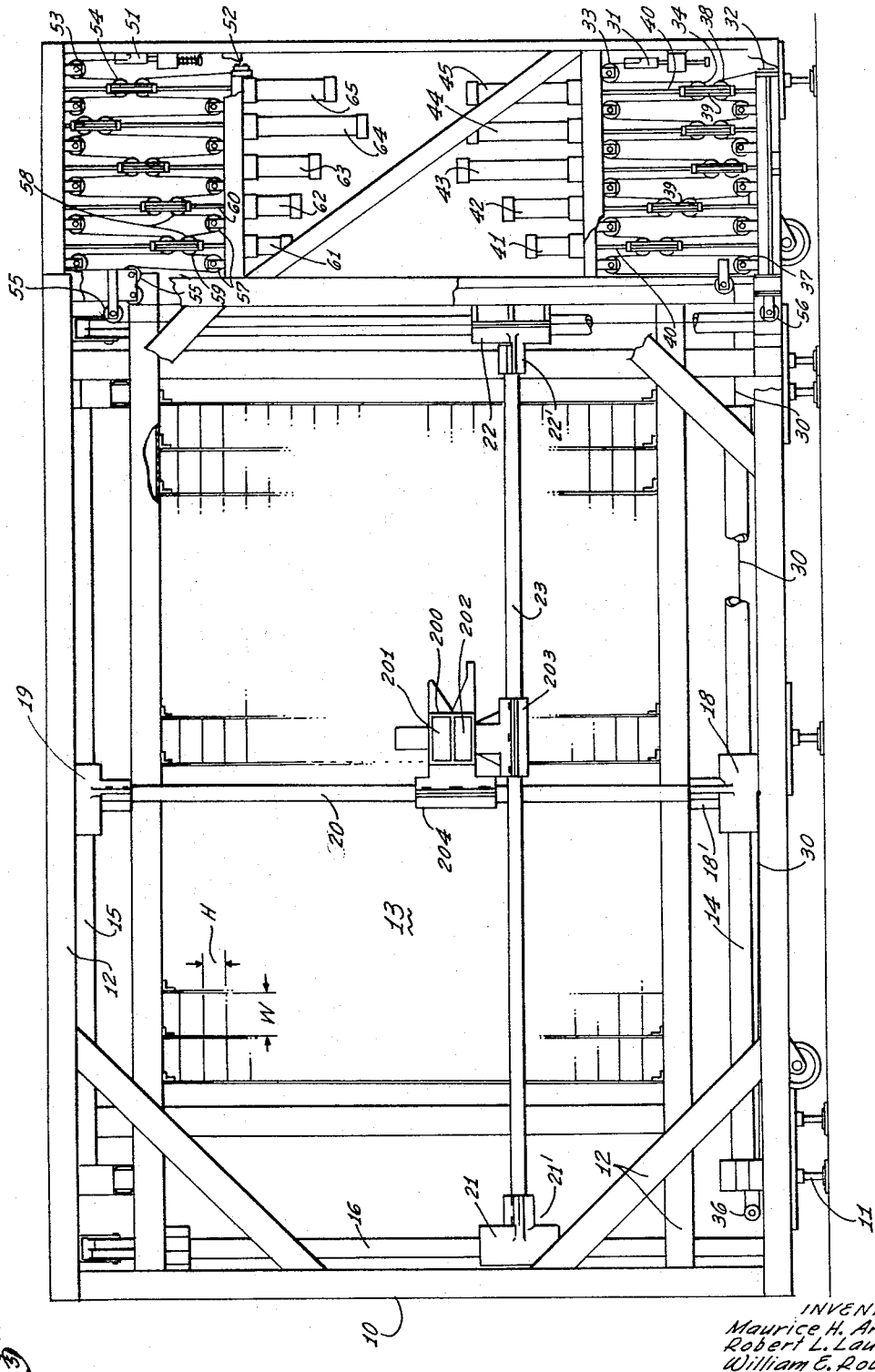

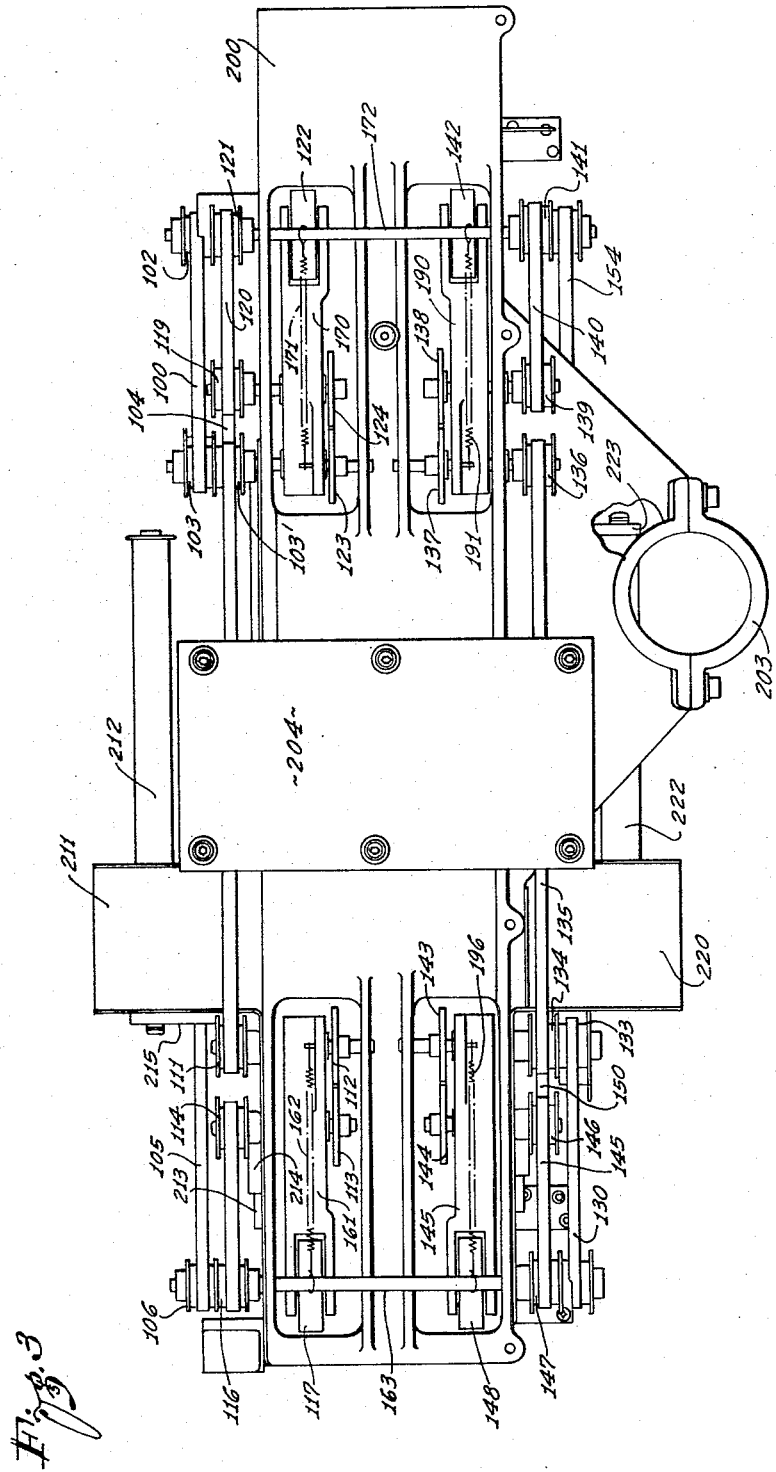

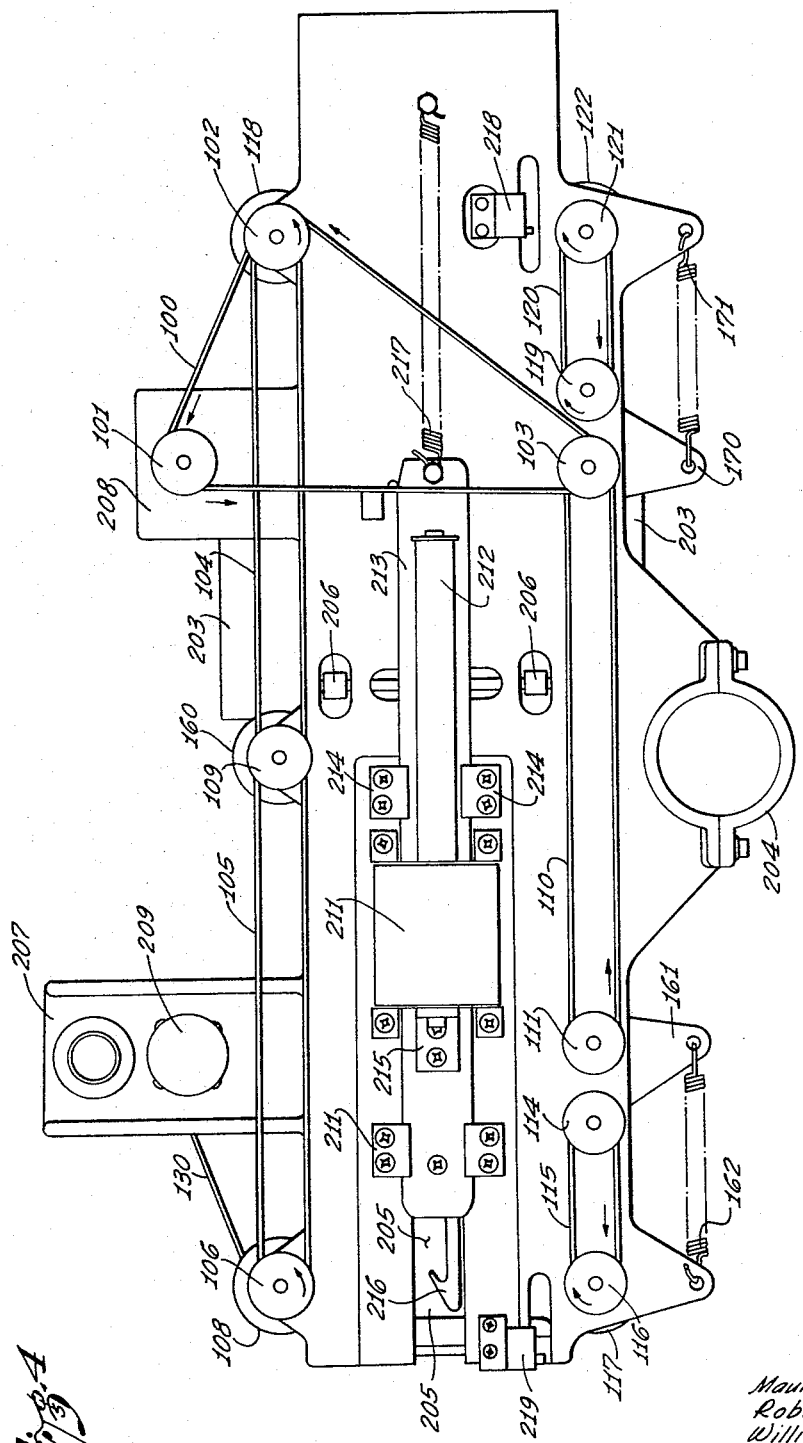

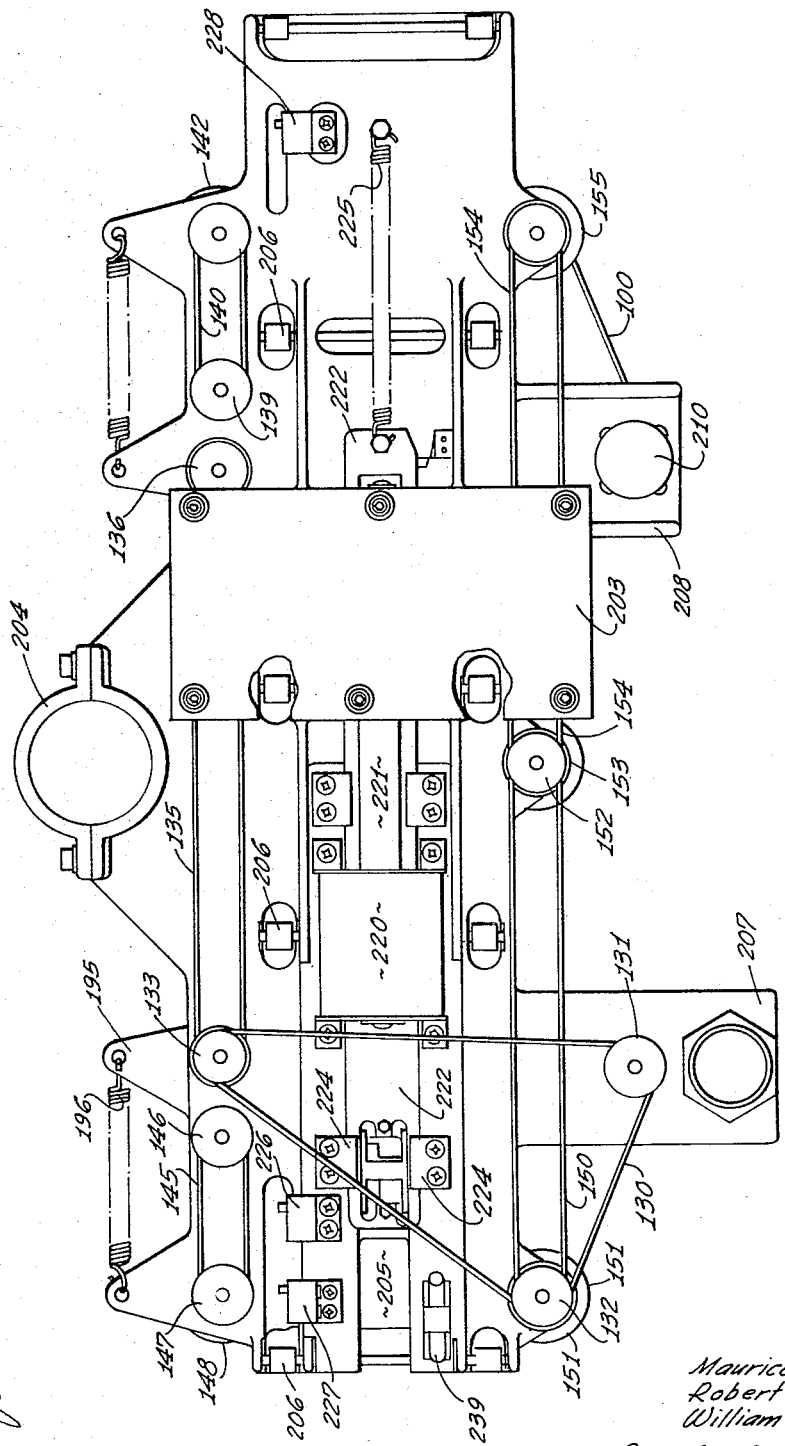

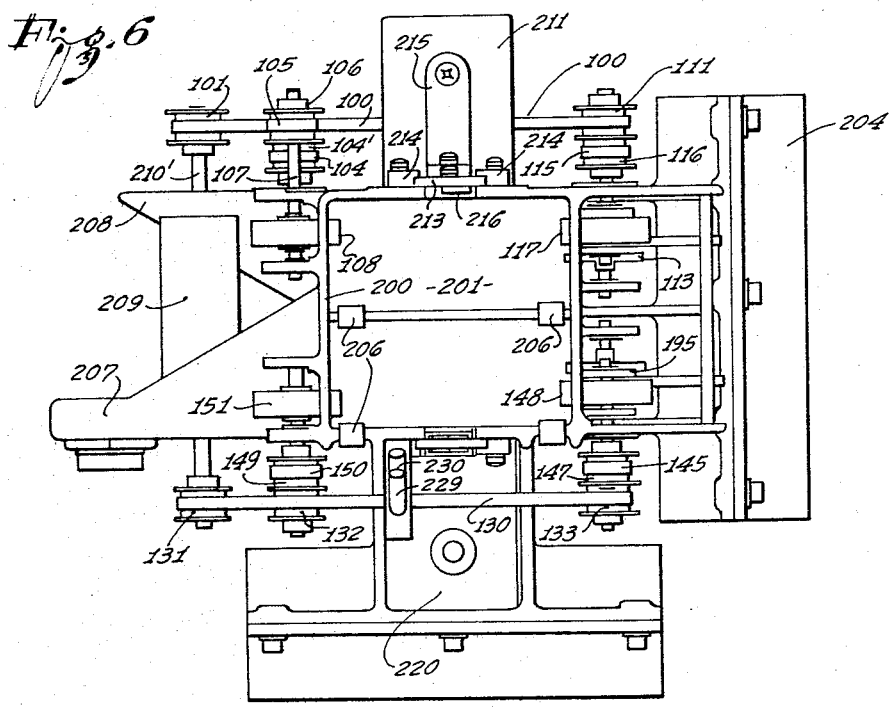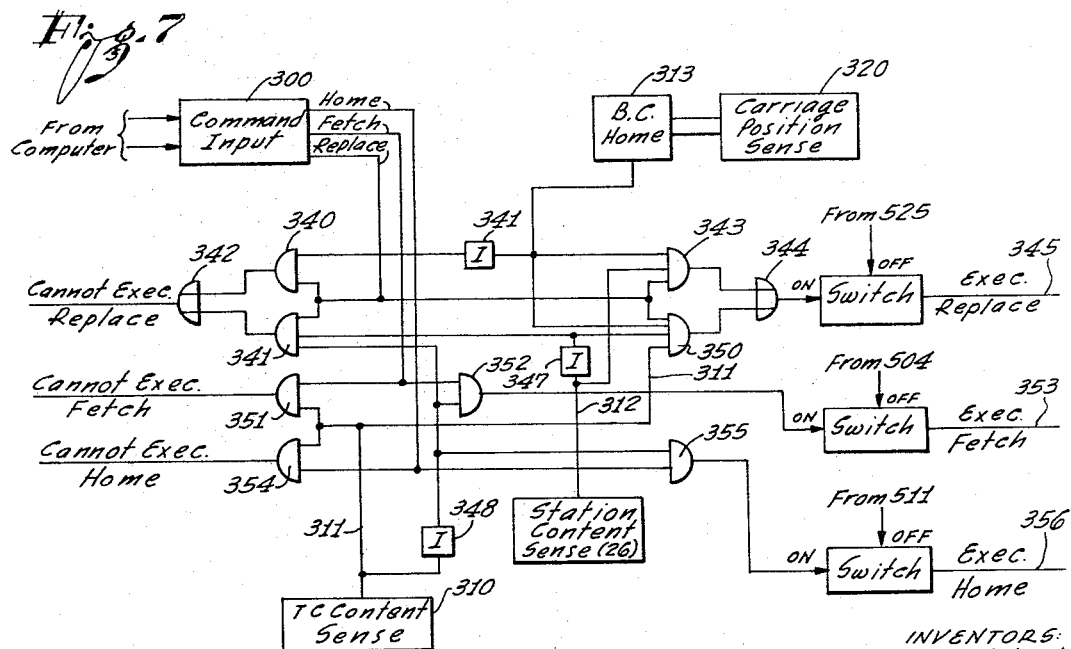

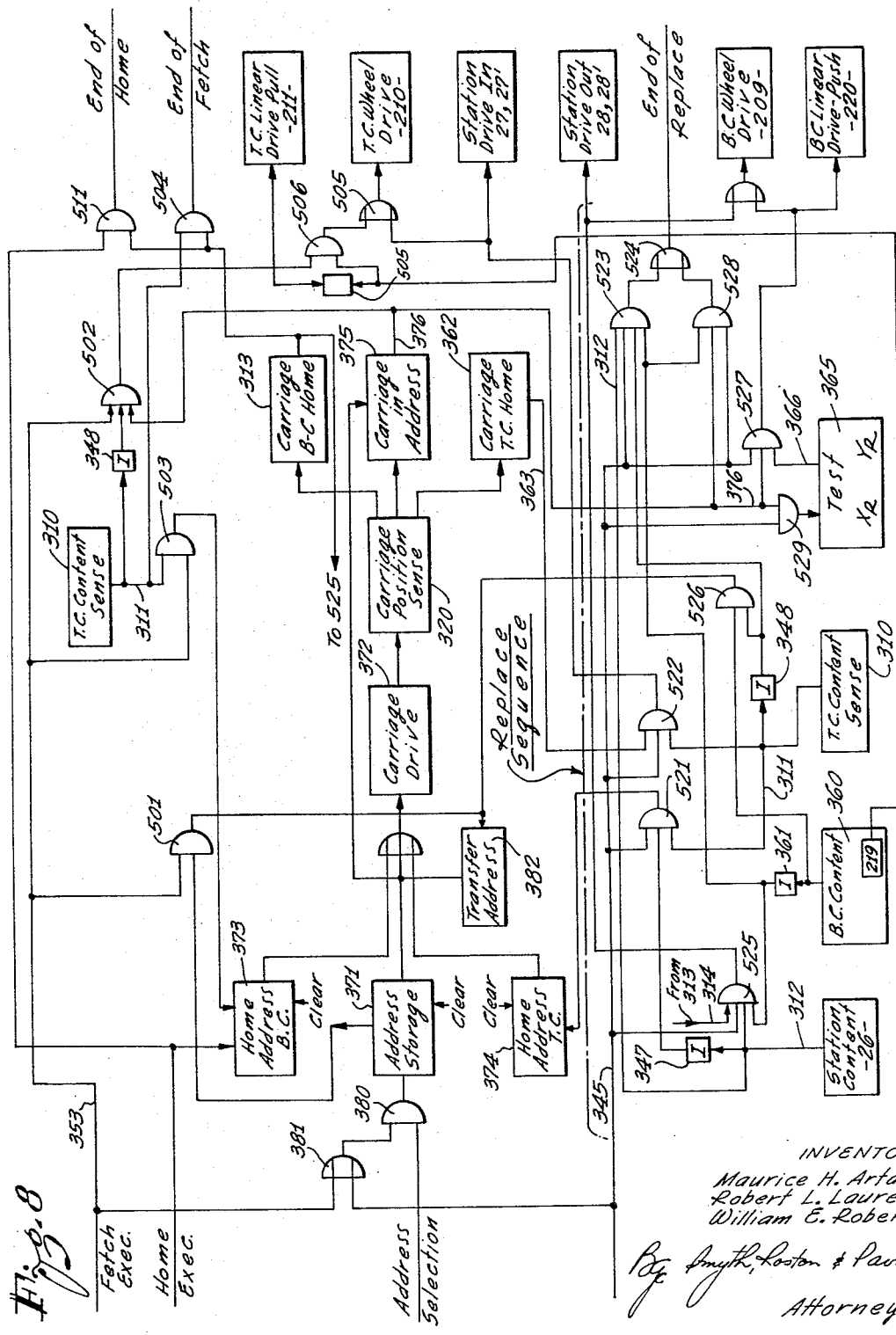

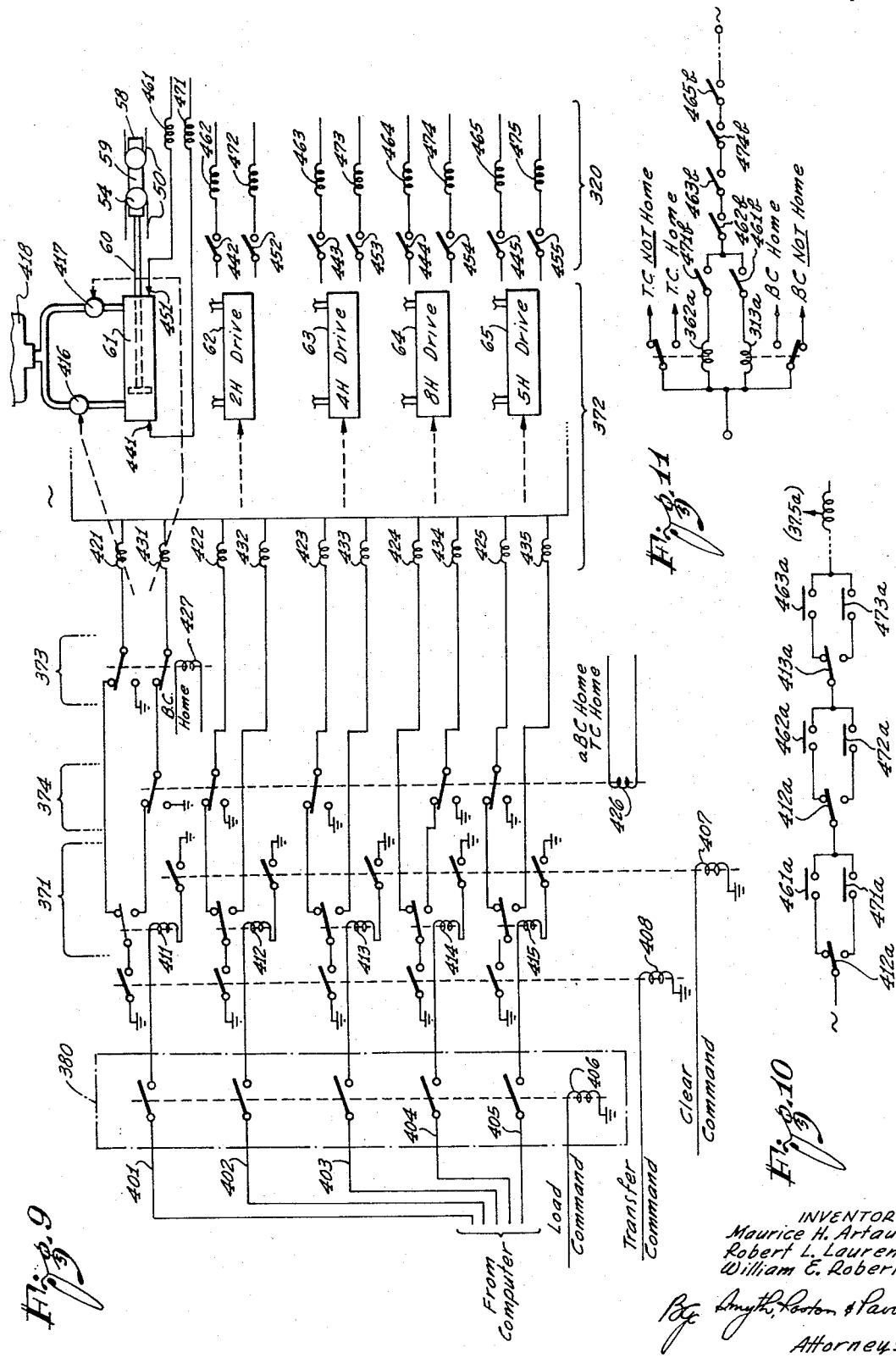

United States Patent Office 3,297,379
Patented Jan. 10, 1967

3,297,379
FILE SELECTOR
Maurice H. Artaud, Torrance, Robert L. Laurent, Palos Verdes, and William E. Roberts, Culver City, Calif., assignors to The Magnavox Company, a corporation of Delaware
Filed Nov. 12, 1964, Ser. No. 410,628
20 Claims. (Cl. 312—223)

The present invention relates to an input and output device of a permanent memory or data storage device containing individual documents as information carrier. More particularly the invention relates to a device permitting the handling of packaged data storage elements such as punched cards, film chips, or the like, and for retrieving same from a general storage area.

The handling of large amounts of information stored by means of convenient storage elements creates problems which become increasingly difficult since, in general, the amount of data to be handled is rapidly increasing. A typical kind of information to be handled, for example, includes drawings such as technical drawings recorded on film chips together with identifying codes. The storing of large amount of such film chips requires that any such film chips can be found and retrieved within short periods of time. Additionally, it might be required to find groups of such film chips within reasonable periods of time.

The invention now relates particularly to a system in which individual documents such as punched cards or film chips are stored in magazines whereby each magazine contains a variable quantity of such cards or film chips. The problem to be solved is that for retrieving individual documents, the magazines are to be placed from time to time into a processing station, and the cards in the magazines are then sequentially processed, for example, by searching for a particular one of such cards or a particular number of such cards. Of importance furthermore is that the processing is a continuous one, so that the station will have to receive in sequence a large number of such magazines. For example, the processing station may be required to assemble a particular combination of such documents each of which being contained in a different magazine.

It is a specific feature of the present invention to provide means permitting the rapid exchange of magazines for such station, permitting the storing of such magazines in a convenient way, and permitting, furthermore, the transport of magazines to and from the station in the shortest possible time.

In accordance with the invention a rack or cabinet is provided in which a number of compartments are arranged regularly, for example in an array, i.e., in a matrix type fashioning defining several rows and columns. The compartments are open at one end defining a common operating plane. A carriage is provided with two compartments for respective alignment with any one of these cabinet compartments. The carriage is movable in two dimensions along the rows and columns of the cabinet compartments, and a position drive is employed to place either one of two compartments of the carriage in front of a selected cabinet compartment. The carriage is equipped to drive magazines out of a cabinet compartment and into a carriage compartment. The carriage furthermore is equipped with a drive permitting the driving of a magazine out of a carriage compartment for example into a respectively aligned cabinet compartment. Additionally the carriage can be moved to place either one of its two compartments in juxtaposed and aligned relationship with the processing station, and the carriage drive is, furthermore, adapted to drive a magazine out of a carriage compartment into the station or to drive a magazine out of the station and into a carriage compartment.

The entire sytsem is devised in such a manner that actually three magazines can be handled concurrently. For example, one magazine may be in the station, and while the documents in this magazine are being processed, a second magazine is being returned by the carriage to a particular cabinet compartment, preferably the one from which the magazine was fetched originally. Subsequently thereto a magazine from another cabinet compartment may be fetched, i.e., moved into one of the compartments of the carriage, and brought back to the station. When processing of the cards in the magazine then in the station is completed, the magazines are exchanged, and the one just fetched is placed into the station, while the magazine previously in the station is brought back to the cabinet compartment from which it was fetched originally.

To control the moving of the carriage along the cabinet compartments or to and from the station, and to control the driving of the magazines into and out of the carriage there is provided a system which is responsive to command signals externally produced, and initiating a sequence of steps to be carried out in response to sequentially changing conditions in the entire device. For example, magazines will be driven into a compartment of the carriage in response to a signal indicating that this carriage compartment is empty, and in further response to another signal indicating that this carriage compartment has arrived at a particular position; subsequent steps are then made dependent upon completion of the step during which the magazine has been driven into the carriage compartment.

A significant aspect of the apparatus in accordance with the invention is the fact that it is computer oriented. This computer orientation means that the document retrieval can be carried out in programed steps and upon occurrence of specific command signals issued by a computer; or the apparatus signals back to the computer the possibility or impossibility of executing such a command, and if execution is possible the combination thereof is likewise signalled to the computer. For this purpose, a control system is devised to carry out certain operation sequences in response to specific command signals. One of such sequences will be carried out in response to a so-called "fetch" command signal, which sequence comprises the movement of the carriage to place a particular compartment of the carriage in front of a particular cabinet compartment, to pull a magazine out of the cabinet compartment and into the juxtaposed carriage compartment, and to subsequently drive the carriage so that the other carriage compartment is juxtaposed to the processing station.

A more simple command signal which may be derived from the computer is a so-called "home" command signal in response to which the carriage is driven so that one particular carriage compartment is juxtaposed to the processing station.

Another command is called "replace" command resulting in different sequences depending upon the status of the station. If at the time of a "replace" command a magazine is in the processing station, the sequence to be carried out in response to the issuance of a replace command signal by the computer is as follows: the magazine in the station is driven into one of the carriage compartments. If the other carriage compartment contains a magazine, such magazine is subsequently driven into the station. Subsequently thereto the carriage is driven to assume a position in which the carriage compartment now containing the magazine which was in the station at the time that the replace command signal was issued, faces the so-called replace address, which is the cabinet compartment into which this latter magazine is to be pushed in. Upon arrival of the carriage at the selected address, the magazine is being pushed into that empty cabinet compartment.

If upon issuance of the replace command signal no magazine is in the station the magazine in one of the carriage compartments if any, is then moved into the station.

It can be seen that the above described full cycle for handling three magazines results from an alternation between "fetch" and "replace" command signals. The subdividing of such full cycle into two sequences, the fetch sequence and the replace sequence, gives versatility to the apparatus of the invention particularly in case there is a pause in permitting the station to be emptied of a magazine without requiring replacement by another magazine.

Furthermore, the time of processing a magazine may vary from magazine to magazine. The inventive system permits immediate exchange of magazines in the station in that always a new magazine is waiting in one carriage compartment near the station until processing of the magazine then in the station is completed. The processing station will issue a processing completed signal to the computer whereupon the computer will issue to the inventive device a "replace" command signal. After execution of the replace command, the device is ready to receive, for example, a "fetch" command to place another magazine close to the station for rapid magazine exchange in response to another "replace" command.

While the specification concludes with claims particularly pointing out and distinctly claiming the subject matter which is regarded as the invention, it is believed that the invention, the objects and features of the invention, and further objects, features, and advantages thereof will be better understood from the following description taken in connection with the accompanying drawing, in which:

FIGURE 2 illustrates in front view the cabinet, the carriage and its drive;

FIGURE 3 is a side elevation of the carriage used to transport magazines;

FIGURES 4 and 5 illustrate respectively top and bottom views of this carriage;

FIGURE 6 illustrates a front view of the carriage;

FIGURE 7 illustrates schematically a block diagram of a network for connecting the device in accordance with the invention to a computer to receive therefrom command signals and to decide whether these command signals can or cannot be executed;

FIGURE 8 illustrates schematically a block diagram of several elements described with reference to FIGURES 1 through 6 and including further a logic network to explain the sequences for executing several command signals;

FIGURE 9 illustrates by way of example a circuit diagram of implementing some of the blocks shown in FIGURE 8;

FIGURE 10 illustrates a portion of a circuit network implementing a comparator to compare desired and actual position of the carriage;

FIGURE 11 illustrates a circuit network for detecting two different positions of the carriage relative to the processing station.

Figures 1, 12:
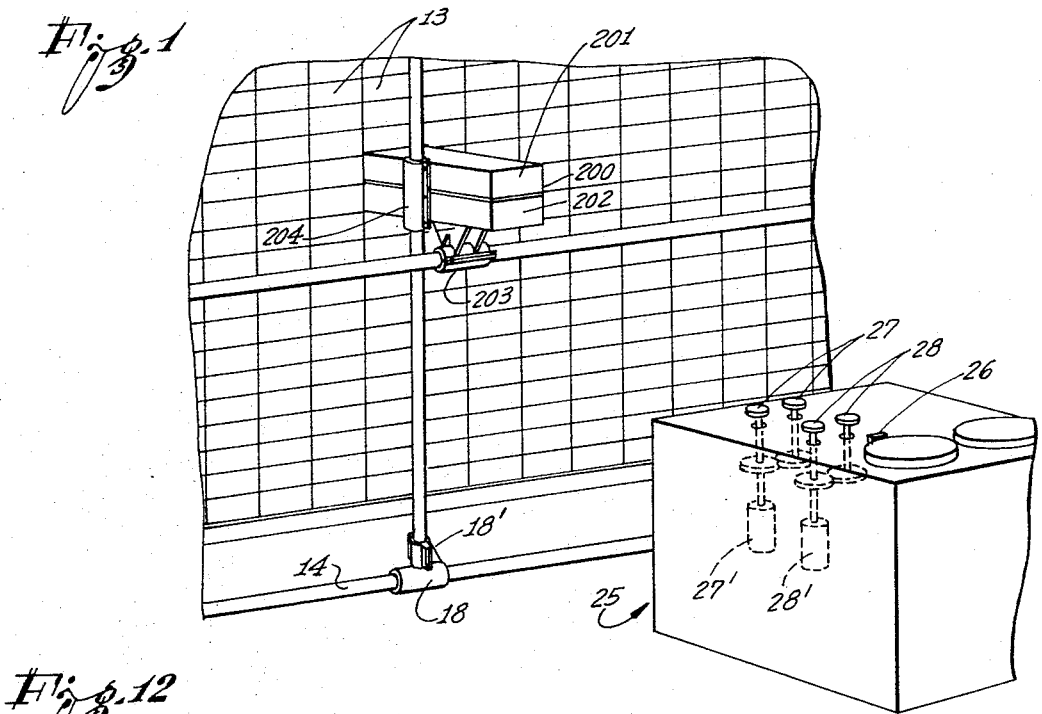
FIGURE 1 illustrates a perspective view of a cabinet, carriage and a processing station according to the preferred embodiment of the invention.
FIGURE 12 illustrates two tables for the positioning codes of the carriage.

Proceeding now to the detailed description of the drawing, in FIGURES 1 and 2 thereof there is shown a frame 10 having retractable stands 11 and a plurality of interconnected frame bars such as 12. The frame 10 contains a cabinet 13 comprised of a large plurality of similarly shaped compartments arranged in columns and rows. There are provided fifteen columns and twenty rows of compartments. These three hundred compartments 13 are open with one side and they face with their respective opening a common operating plane which extends parallel to the drawing of FIGURE 2. These compartments may also be open to the rear for manual removal and insertion of magazines.

Toward the front of the cabinets 13 and somewhat above and below thereof, there are provided two horizontally positioned bars 14 and 15 extending parallel to each other and defining a plane that is parallel to the above mentioned operating plane but being somewhat displaced to the front thereof. To the left and to the right of the cabinet and also somewhat to the front of the operating plane, there are provided two vertical bars denoted with reference numbers 16 and 17 respectively.

Two ball bushings 18 and 19 are positioned to glide on the bars 14 and 15, respectively. The two ball bushings 18 and 19 are comprised of short tubes receiving the bars, and they further have tubular flanges 18' and 19', respectively, and extending transversely to the direction of extension of the bars 14 and 15. The two tubular flanges 18' and 19' are aligned to each other in vertical direction to receive a vertical transport bar 20.

Two ball bushings 21 and 22 are positioned to glide on the vertical support bars 16 and 17 respectively. The two ball bushings 21 and 22 have also tubular shape to receive these support bars, and they have additionally tubular portions 21' and 22', respectively, extending horizontally and in a mutually aligned relationship to receive a horizontal transport bar 23.

A carriage 200 is provided with two tubular guides 203 and 204 respectively receiving and being passed through by the two transport bars 23 and 20. The transport bars 20 and 23 are independently movable by means of the ball bushings 18–19 and 21–22 respectively. Thus, if the two ball bushings 21 and 22 move the bar 23 up or down jointly, the carriage 200 is transported in the vertical direction and the guide 204 slides along the transport bar 20. When the two ball bushings 18 and 19 move the bar 20 in a horizontal direction, the carriage 200 follows this movement, whereby the guide member 203 slides on the bar 23.

The sliding of guide 204 on the transport bar 20 for adjusting the vertical position of the carriage 200 can be carried out regardless of whether or not the transport bar 20 moves in horizontal direction. In a similar manner, the guide member 203 can slide in a horizontal direction on transport bar 23 regardless of whether or not simultaneously the transport bar 23 is moved up or down. Thus, horizontal and vertical positions of carriage 200 are independently adjustable along the above mentioned operating plane.

The carriage 200 has two compartments 201 and 202, each being open at its own ends, and each compartment is individually alignable with any of the compartments of cabinet 13. It is the specific purpose of the carriage 200 to transport magazines stored in the compartments of cabinet 13 to a processing station 25 or to return magazines from the processing station 25 to a selected one and empty compartment of the cabinet 13. The processing station is of the type as for example disclosed in U.S. Letters Patent 3,032,750 and 3,039,681 or in U.S. Letters Patent application Serial No. 817,853, filed June 2, 1959, all having common assignee. The station 25 has a pair of rollers 27 driven by a motor 27' for driving a magazine into the station. When the magazine has arrived in the station and in proper position therein a switch 26 signals completion of this magazine positioning. A second pair of rollers 28 driven by motor 28' serves to drive a magazine out of the station. Each pair of rollers is coupled by a suitable gear. The roller may alternatively be driven through a common motor and suitable clutches. In case one uses a reversible drive, one pair of rollers suffices.

The carriage 200 will be described more fully below with reference to FIGURES 3 to 6. For the moment it is sufficient to state that the two carriage compartments 201 and 202 are open at both ends, and the open ends facing the operating plane are alignable with individual compartmeents of cabinet 13. Magazines can be transported into and out of the carriage compartments, and out of or into the respectively juxtaposed cabinet compartment. Likewise, a magazine in a carriage compartment can be transported into a processing station 25. Or a magazine can be returned from the station 25 into a carriage compartment. The individual mechanism of moving a magazine into or out of a carriage compartment will be also explained more fully below.

In the following it will be described how the carriage 200 can be placed into alignment with the processing station 25 or with a selected one of the cabinet compartments 13.

The principle employed for moving the carriage 200 is to provide a mechanism which moves the carriage from one position to another at the shortest possible way. Any individual vertical carriage position can be defined as an integral multiplum of the height H of any the cabinet compartments. Similarly, the carriage is to be moved horizontally from one position to another one, whereby always a position change is an integral multiplum of the width w of any cabinet compartment.

The elements 18, 19 and 20 are moved in horizontal direction by means of the following arrangement: There is provided the belt or cable 30 which is more or less centrally attached to the ball bushing 18. Belt or cable 30 has its two ends fastened at clamping points 31 and 32. Following the extension of rope or belt 30 from the connection point 31, it runs over the following elements. At first belt or cable 30 winds alternatingly above and around stationary pulleys 33 and vertically movable pulleys 34. There are provided altogether six of such stationary pulleys 33 and five vertically movable pulleys 34. The stationary pulleys 33 are horizontally aligned. Any movable pulley is symmetrically disposed to two juxtaposed stationary pulleys. Leaving the last one of the stationary pulleys 33, the belt or cable 30 runs downward and is reoriented in horizontal direction by another stationary pulley 35. From there it runs in parallel to bar 14 towards and around a stationary pulley 36 to reverse its direction so as to return back towards the first one of a set of stationary pulleys 37. In between this particular pulley 37 and pulley 36, belt 30 is fastened to ball bushing 18.

Again, there are provided five such stationary pulleys 37 which are positioned in horizontally aligned relationship. There is provided another set of vertically movable pulleys 38, with any one movable pulley being symmetrically disposed relative to two juxtaposed stationary pulley 37. Belt 30 is passed alternatingly over and around a stationary pulley 37 and a movable pulley 38. The belt when leaving the last one of these five movable pulleys 38 is then clamped with its other end at clamping point 32.

There are altogether five vertically movable pulleys 34 and five vertically movable pulleys 38 as stated. These pulleys are vertically aligned in pairs, and each pair is interconnected by means of a guide assemby 39; there are accordingly five such guide assemblies 39. Thus, one pulley 34 and one pulley 38 are mounted together in one guide assembly 39.

A vertical movement, for example, in upward direction by any one guide assembly 39 decreases the distance of the respective upper pulley 34 thereof from its respective two neighboring stationary pulleys 33, while the distance of the respective lower pulley 38 from its respective pair of neighboring pulleys 37 increases for precisely the same distance. The ball bushing 18 will thereby move in horizontal direction and also for precisely twice that distance.

Any one of the five guide assemblies 39 can be activated for movement in vertical direction by means of a piston rod 40, and there are altogether five such piston rods 40 accordingly. The piston rods 40 respectively move in five cylinders 41, 42, 43, 44 and 45. The cylinders 41 through 44 are all of different lengths, and particularly the piston rod stroke permitted and controlled by each of these cylinders is a different one. However, the two cylinders 44 and 45 permit similar piston rod strokes.

The arrangement of these piston rods and of the cylinders is an important one. The pistons in each of these cylinders are always moved from one extreme position to the other, i.e., each piston is activated until it abuts one or the other end of the respective cylinder or other suitably provided stops.

The cylinder 41 now imparts upon its piston rod 40 and the respectively associated guide assembly 39 a stroke length to move belt 30 by precisely one compartment width W. The cylinder 42 imparts upon its respective piston rod 40 and the guide assembly 39 a stroke length to move belt 30 by precisely 2W. The cylinder 43 imparts upon its piston rod 40 and the respectively connected guide assembly 39 a stroke length to move belt 30 by precisely 4W. Each one of the two cylinders 44 and 45 imparts upon their respectively associated piston rods 40 and the respectively connected guide assembly 39 a stroke to move belt 30 by precisely 3½W.

The two cylinders 44 and 45 are always actuated in unison so that together they impart on the belt or cable 30 a movement that is precisely equal to 7W. The reason for this division in stroke length is only a matter of structural convenience in order to avoid too long a cylinder.

It will also be seen from the drawing that in the case any one of the cylinders is activated to move the respectively associated piston rod upwardly, the ball bushing 18 and bar 20 moves to the right and the carriage 200 follows this rightward movement accordingly. Conversely, if any cylinder moves its respectively associated piston rod down, the ball bushing 18 and the carriage 200 are moved to the left. It can also be seen that at each time the belt moves, this movement is a composite one of all activated pistons. Any particular combination of piston rod positions defines a particular position of the assembly 18, 19, and 20 and thus defines a particular horizontal position of carriage 200.

If all cylinders have been activated in such a manner the piston rods have assumed their respective projecting position, then the ball bushings 18 and 19 are moved so far to the left that the carriage 200 and particularly its compartments 201 and 202 face the cabinet compartments of the first row to the left. If all cylinders are activated to have their respective piston rods completely retracted, the ball bushing 18 has then been moved so far to the right that the upper and lower compartments of carriage 200 face compartments of the last row of cabinet compartments to the right.

Table I in FIGURE 12 defines the fifteen different horizontal positions of carriage 200 by having them numbered 0 through 14, with 0 being the position wherein the compartment of carriage 200 faces the first row to the left while position 14 is defined when the carriage 200 faces the last row of cabinet compartments to the right. The table, furthermore, indicates positions or states of activation of the five cylinders 41 through 45, whereby a 0 denotes a fully projected piston and 1 denotes fully retracted piston position.

It will be appreciated, that the cylinders with piston rods define a weighted binary displacement scale whereby a code number, on the one hand defines projection and retraction of the several piston rods and, on the other hand, the code number identifies the row of cabinet compartment in terms of carriage positioning 0000 is the first row—1111 is the fourteenth row.

The carriage 200 is moved vertically by means of the vertically movable assembly 21, 22 and 23 as follows: There is first provided a belt or cable 50 fastened with its two ends at stationary clamping points 51 and 52. At an intermediate point, the belt 50 is secured to ball bushing 22. In between the connection of belt 50 at point 51 and at ball bushing 22 this belt 50 runs over the following pulley arrangement.

There is provided a row of six, stationary, and horizontally aligned pulleys 53 and a set of altogether five vertically movable pulleys 54. The belt 50 runs alternatingly over and around a stationary pulley 53, a movable pulley 54, a stationary pulley, etc. Leaving the last one of the stationary pulleys 53, another stationary pulley 55 guides the belt 50 vertically along tube 17. A stationary return pulley 56 is positioned at the bottom of the arrangement to reverse the direction of belt 50 and guides it towards its point of connection with the ball bushing 22. Upwardly, the belt 50 then runs over a stationary pulley arrangement 55', and from there over another arrangement comprised of alternatingly arranged pulleys 57 and vetically movable pulleys 58. Leaving the last one of the vertically moving pulleys 58 the belt then terminates at the point of attachment 52.

Again, the vertically movable pulleys 54 and 58 are joined in pairs on a guide assembly 59, so that there are altogether five such guide assemblies 59 accordingly. Each of these guide assemblies 59 is activated by a piston rod 60, and there are altogether five such piston rods 60. The five piston rods 60 are respectively moved, i.e., displaced in upward or downward direction by cylinders 61, 62, 63, 64 and 65 respectively.

These five cylinders 61 through 65 each impart upon their respectively associated piston rod vertical strokes which are arranged on a binary scale whereby half of the height H of the cabinet compartments serves to define the unit of this scale. In particular, the cylinder 61 moves its respectively associated piston rod 60 with guide assembly 59 by a distance displacing belt 50 by 1H. The cylinder 62 moves its respectively associated piston rod 60 with guide assembly 59 for a distance displacing belt 50 by 2H. The cylinder 63 moves its respectively associated piston 60 with guide assembly 59 for a distance displacing belt 50 by 4H. The cylinder 64 moves its respectively associated piston rod 60 with guide assembly 59 for a distance displacing belt 60 by 8H, and the cylinder 65 moves its respectively associated piston rod 60 with guide assembly 59 by 5H.

It can thus be seen, that any particular combination of piston positions due to a specific state of activation of the five cylinders 61 through 65 the assembly 21, 22 and 23 has a particular vertical position, and any change in the state of piston projection or retraction is carried out in steps of H. The Table II in FIGURE 12 illustrates with 0 to 1 whether or not a cylinder has moved its respectively associated piston rod up or down. When all piston rods 60 are projecting from their respective cylinders, the assembly 21, 22 and 23 is in its lowermost position, whereby the top compartment 201 of carriage 200 is juxtaposedly positioned to the lowest row of cabinet compartments. Whenever all pistons 60 are retracted by their respective cylinders, the assembly 21, 22 and 23 is in its uppermost position whereby the bottom compartment 202 of carriage 200 faces the top row of cabinet compartments 13.

The pistons and piston rods are all independently movable, and each particular position of the carriage 200, particularly, for example, of the bottom compartment 202 thereof relative to any of the cabinet compartments, may be attained by placing the ten cylinders into a particular combination of energization, and deenergization. The cylinder state of activation and the control of each cylinder for such activation is carried out in accordance with a particular code pattern, which is used to place the carriage 200 and particularly the bottom compartment 202 into alignment with a specific cabinet compartment. The code pattern includes two codes for each cabinet compartment, one defining the horizontal and the other defining the vertical position. Thus, a specific cabinet compartment is being called upon by means of two codes. These codes have additional significance. The specific binary scale illustrated in Tables I and II and representing states of cylinder activation and piston positions can be interpreted as defining a binary code or address for identifying the several stationary cabinet compartments when respectively juxtaposed to one of the carriage compartments 201 or 202. All of the cabinet compartments, therefore, can be labeled with such binary address codes written in terms of piston displacement for the carriage 200 addressing the cabinet compartments by aligning a selected one with a particular carriage compartment. Since the carriage has two compartments, the cabinet compartments can actually be defined by two addresses depending upon alignment with the top or with the bottom compartment of the carriage. The addresses are thus being written in terms of one carriage compartment only, which for example, is the bottom compartment. For this reason, Table II actually shows twenty-one position codes wherein the code 00000 actually is no row at all as far as the bottom compartment is concerned, but when in this position, the top compartment faces any compartment of the first row. It will be appreciated, that if the bottom compartment 207 of carriage 200 is to be aligned with a specific cabinet compartment, then the address is directly reproduced by the cylinder piston positioning device. If the top compartment is to be aligned with a particular cabinet compartment, this latter cabinet compartment can be addressed in four different ways: One can use the address of the cabinet compartment which is positioned directly underneath the desired one. Since a cabinet address in relation to the top compartment is used always when a magazine is to be fetched from the cabinet, the computer can be programed to issue such modified address in case of a fetch command. Alternatively, the control circuit of the system itself can be equipped to provide for a subtraction by way of binary addition of one unit from the address furnished to the piston control. This, of course, depends on the particular mode of piston control and on the device providing these addresses. The piston control for carriage positioning will be described more fully below. Among these addresses, there are two of still further significance. These addresses are: horizontal 0111, vertical 01000. The other address is: horizontal 0111, vertical 01001. These positions are called "home positions," and they are characterized by the fact that in the first one of these home positions the top compartment 201 is aligned with the station 25, while in the second one of these home positions, which differs from the first one by exactly 1 height, the bottom compartment 202 of the carriage 200 is aligned with the station 25. These positions will, therefore, be referred to hereinafter as top compartment home position, or TC home, and as bottom compartment home position, or BC home. Whether or not these home positions are also addressable cabinet addresses is a matter of convenience and not essential.

The arrangement as described thus far has its primary purpose to move the carriage 200 from a position relative to the cabinet to another position relative thereto, whereby the carriage compartments always face cabinet compartments or the station. This is to carry out the following functions: The carriage 200 is to be moved so that one of its compratments faces a particular cabinet compartment, whereby the address is defined by a particular combination of piston positions as outlined above. The magazine in the so-addressed cabinet compartment is to be pulled out of this cabinet compartment and into that one of the carriage compartments, for example, the top carriage compartment. Subsequently the carriage 200 is moved so its bottom compartment is in the above defined home position. A magazine in the station is then to be pulled into the bottom compartment of the carriage 200, whereafter the carriage is to be moved down by 1H, so that the top compartment of the carriage is in home position, and the previously fetched magazine is pulled out of the top compartment and placed into the station. After completion of this station reloading, the carriage is moved until its filled bottom compartment is aligned with an empty cabinet compartment, which preferably is the one out of which the particular magazine now in the bottom compartment had been fetched originally.

Additionally, the device must be equipped with means to determine whether a particular cabinet compartment into which the magazine is to be pushed from the bottom compartment of the carriage, is in fact empty, so that the magazine can be pushed into such cabinet compartment indeed. Also, the device must be equipped with means to determine whether upon fetching a magazine from a cabinet compartment there is in fact a magazine in such cabinet compartment.

It will be understood that basically two different kinds of sub-routines are to be performed in such mode of operation. In one type of operation the carriage 200 must be moved along the above defined operating plane whereby the top or bottom compartment either face specifically addressed cabinet compartments or the top or bottom compartment of the station faces the station. The ten aforedescribed cylinder and piston rod arrangements move the carriage accordingly, and the control of these piston and cylinder arrangements result in a specific and predetermined positioning of the carriage 200.

The other kind of operation requires transport of magazines into or out of the two compartments of the carriage 200. The specific layout of the carriage 200 will now be described more fully with reference to FIGURES 3, 4, 5 and 6.

Proceeding now to the description of the carriage 200 there is shown a basic body having the upper compartment 201 and the lower compartment 202. A horizontally extending wall 205 separates the two compartments 201 and 202. The bottom of the carriage 200 supports the tubular slide member 203 with the aid of which the carriage slides on the above mentioned horizontal cross bar 23. The other tubular slide member 204 is attached to one side of the carriage for guiding the carriage in vertical direction along the above mentioned vertical guide bar 20.

The two compartments have dimensions comparable with the above mentioned cabinet compartments. Idle rollers 206 permit passive rolling of a magazine into and out of either one of the two compartments. At the side of the carriage opposite to the side supporting tubular member 204, there are provided two extension plates 207 and 208 for supporting driving motors 209 and 210. The purpose of these motors will be explained more fully below.

A linear actuator 211 is mounted on top of carriage 200 which actuator upon energization moves a linear armature 212. A flat longitudinal bar 213 runs on top of the carriage 200 and in four guide members 214 thereon. The longitudinal, flat bar 213 is attached to the armature 212 of the linear actuator 211 by means of an L-shaped bracket member 215. The front of bar 213 terminates in a hook 216, and the rear portion of bar 213 is connected to one end of a spring 217. The other end of spring 217 is anchored to the top of the carriage 200.

Thus, upon energization of actuator 211 the armature 212 will move in a direction which permits passage of the armature 212 through the actuator 211. Thereby the bar 213 with hook 216 is moved in a direction opposite to the tension of the spring 217. For retracting the assembly 212, 213, 215 and 216, the linear actuator 211 is energized in opposite direction, spring 27 serving as safety device in case of power failure. The direction of movement of bar 213 is maintained by the guides 214. The purpose of this arrangement is to have the hook 216 reach into a cabinet compartment, to grip a magazine therein and to pull the magazine into the top compartment.

The top of the carriage 200 has two slots into which project feeler arms of limit switches 218 and 219, respectively. The limit switch 219 is positioned to sense and respond immediately when a magazine enters the upper compartment 201. Proper positioning of the magazine in the upper compartment is signaled by concurrent activation of limit switches 218 and 219. These switches will, in effect, govern the drive, i.e., the motor 210 as will be explained more fully below.

The bottom of carriage 200 supports another linear actuator 220 having an armature 221 and being connected to a flat longitudinally extending bar 222. The flat bar 222 runs in guides 224 and is spring biased by means of spring 225. The spring 225 is attached to the rear end of bar 222, while the other end of spring 225 is attached to the bottom of carriage 200. The bar 222 when actuated is capable of pushing a magazine completely into a cabinet compartment after such magazine has been rolled out of bottom compartment 202 only partially.

The bottom of carriage 200 is also provided with two slots; the front slot is provided to receive the feeler arms of two limit switches 226 and 227 for sensing the position of a magazine when in the lower compartment 202. The other end of the bottom has the second one of the two above mentioned slots and a feeler arm of a limit switch 228 projects into this slot and into the lower bottom chamber 202 for monitoring at the other end thereof the presence or absence of a magazine.

A photocell 229 and a light source 230 are attached to the bottom of the carriage 200 and at the front thereof. These two optical elements are oriented to face upwardly in the direction of a cabinet compartment when aligned with bottom compartment 202 of the carriage. With the aid of these two optical elements, the presence or absence of a magazine in such cabinet compartment is monitored prior to the discharge of any magazine from the bottom compartment 202 into the aligned cabinet compartment.

Proceeding now to the description of the wheel drives, the wheel drive gripping any magazine which had entered or is about to leave the top compartment 201 shall be explained first. The motor 210 has a driving shaft 210' projecting through the support member 208 and terminating in a sprocket 101. The sprocket 101 drives a positive belt 100 additionally wound around sprockets 102 and 103. It is the purpose of this drive to uniformly drive wheels or drive rollers 108, 117, 118, 122 and 160. The driving connection is made as follows:

The drive roller 118 is directly seated on the shaft journaling the sprocket 102. Another sprocket (not shown) on this shaft drives a belt 104 which in turn drives a sprocket wheel 104' coaxially positioned and positively connected to the second one of the drive rollers 160 and to another sprocket wheel 109 which in turn is drivingly connected to a belt 105. The belt 105 drives a sprocket 106 having a shaft 107 on which is seated for driving connection therewith the third one of these drive rollers, 108.

The two drive rollers 177 and 122 on the other side of the carriage in the upper compartment thereof are driven as follows: The shaft journalling the sprocket wheel 103 also supports a sprocket wheel 103' for driving a belt 110 which in turn drives a sprocket 111. A spur gear 112 is driven by this sprocket 111, and the spur gear 112 meshes with a spur gear 113.

This spur gear reverses the sense of rotation for the rollers disposed on the other side of the compartments. It is apparent that the two drive rollers 117 and 122 have to rotate in the opposite direction as the drive rollers 118, 108 and 160, for uniformly transporting a magazine into and out of the compartment 201. The spur gear 113 is coaxially positioned and mounted on the same shaft with which a sprocket 114 drives a belt 115. The belt 115 drives a sprocket 116, and the shaft drivingly supporting the sprocket 116 also drives the drive roller 117. This shaft for sprocket 116 and drive roller 117 is journalled on a first lever 161, having a fork type end for receiving this drive roller 117. The other end of this lever 161 is linked to a spring 162 engaging with its respective other end a vertical bar 163. The lever 161 itself is pivoted on the shaft which is common to the spur gear 113 and the sprocket wheel 114.

With the upper compartment 201 empty, wheel roller 117 projects into this compartment. A magazine in compartment 201 positively engages the drive roller 117 and pivots the same somewhat but not completely out of the compartment 201. Lever 161 is pivoted thereby against the tension of a spring 162 which is anchored at a post 163.

Similar arrangements are provided for several other drive rollers. The shaft which is common to the two sprockets 103 and 103' is also connected to a spur gear 123 meshing wtih a second spur gear 124 having a shaft on which is seated a sprocket 119 for common rotation. The sprocket 119 drives a belt 120 which in turn drives a sprocket 121. A shaft drivingly supporting the sprocket 121 also supports the last one of the drive rollers 122. This shaft is journalled in the forked portion of a lever 170, and roller 122 is received by this fork. Lever 170 is spring biased by a spring 171 engaging the other end of lever 170 as well as a stationary bar 172. The lever 170 is pivoted on the shaft that is common to the sprocket 119 and this spur gear 124.

The pivot motion of lever 170 is similar but oppositely oriented to the pivot motion of the lever 161 whenever a magazine is in the top compartment 201. It can be seen particularly from the several arrows placed beside several of the sprockets and belts, that upon a particular rotation of motor 210 all of the drive rollers 108, 118, 116, 117 and 122 rotate in such a direction that a magazine can be passed through the top compartment 201 in one particular direction.

The inventive system is laid out in such a manner that the motor 210 always rotates in the same direction because any magazine passes through the top compartment always in one particular direction. In particular, a magazine always enters the top compartment 201 at the opening which is adjacent the drive rollers 108 and 117, and such magazine leaves the top compartment at the opening that is relatively close to the drive rollers 118 and 122. It should be mentioned, however, that the drive and transmission system as shown could very well be operated in a manner that a magazine can move into or out of this top compartment 201 in any direction, in which case the motor 210 has to be a reversible one.

There are also five drive rollers driving a magazine into and out of the bottom compartment 202. These are the drive rollers 151, 153, 155, 142 and 148. These five drive rollers are driven by motor 209. This motor 209 has a shaft which traverses the supporting plate 207 and directly drives a sprocket 131 which in turn drives a main chain or belt 130.

The belt 130 drives sprockets 132 and 133. The shaft drivingly supporting the sprocket 132 drives the second sprocket 149 as well as the first one of the drive rollers 151. Sprocket 149 drives a belt 150 which in turn drives a sprocket which is directly coupled to a second sprocket 152 as well as to the second drive roller 153. The sprocket 152 drives a belt 154 which in turn drives directly the third one of the drive rollers, 155.

The drive rollers on the other side of the carriage adjacent the bottom compartment 202 are driven as follows. The sprocket 133 is mounted on a shaft which supports a sprocket 134 driving a chain or belt 135 which in turn drives a sprocket 136 having a shaft on which is seated a spur gear 137 meshing with spur gear 138. The spur gear 138 is mounted on a shaft on which is mounted a sprocket 139 for common rotation therewith and driving a belt 140 which in turn drives a sprocket 141 having a shaft on which is drivingly seated the fourth one of the drive rollers, drive roller 142.

The roller 142 is received in a fork of a lever 190 which is journaled to the shaft that is common to spur gear 138 and sprocket 139. The lever 190 is biased by a spring 191 having its respective other end connected to the above mentioned vertical post 172.

The shaft that is common to the two sprockets 133 and 134 additionally is drivingly connected to a spur gear 143 meshing with spur gear 144. The shaft journalling gear 144 also drives a sprocket 146 driving a belt 145. The belt 145 drives the sprocket 147 having a shaft on which is drivingly seated the last one of the bottom compartment driver rollers, 148.

The drive roller 148 is received in a fork of a lever 195 which is journalled on the shaft which is common to the spur gear 144 and to the sprocket 146. The lever 195 is spring biased by a spring 196 having the other end connected to the post 163 mentioned above.

In a manner similar to the description of the magazine drive for the top compartment, the drive rollers for the bottom compartment also are driven in such a manner that the magazine passes through the bottom compartment in one particular direction but opposite to the passage of a magazine in the top compartment. A magazine in the bottom compartment engages positively the two wheel rollers 148 and 142, and by virtue of their spring biased pivot support the driving connection is a positive one as between magazine and the five drive rollers.

After having described the structure of the carriage itself and the elements causing movements of the carriage along the operating plane of the cabinet compartments to transport magazines to and from the station, it now shall be described how this system can be controlled from, for example, a computer which in fact governs the processing of the content of magazines in a station 25. This processing is not part of the present invention nor is the computer an inventive element. In the following, it will be described how the control of the magazine transport device can be laid out to be computer oriented.

Basically three different commands will be derived from the computer. These three different situations take in consideration that the total time elapsing from the beginning of transporting a magazine from the processing station to its cabinet compartment up to the subsequent fetching of a magazine from a different cabinet compartment and delivering it to the station, may not be equal to the time of processing documents of a third magazine then being at the station; nor may it be desirable to always replace a magazine in the station by another magazine. Therefore, the computer will develop a so-called "fetch" command in compliance of which the carriage 200 is to pull the magazine from a specific cabinet compartment and transport the same to the station without placing such mazazines into the station. At the end of this fetch command, the carriage ends up in the so-called home position of the bottom compartment.

A second command is a so-called "replace" command according to which a magazine in the station is to be pulled from the station and into the bottom compartment of the carriage and a magazine in the top compartment of the carriage is to be placed into the station. Subsequently thereto the magazine in the bottom compartment is to be transported to a specific address.

If there is no magazine in the station, for example, if there was a pause in the operation, or at the beginning of a full operation cycle, then the replace command will simply cause removal of the magazine from the top compartment of the carriage and delivery thereof into the station. If pursuant to a replace command there is no magazine in the top compartment of the carriage, the replace command simply will result in a removal of a magazine from the station and subsequently the same is transported to an address as set up by the computer.

At the end of this procedure the carriage will end up in alignment with the respective last address into which the magazine fetched from the station had been placed. Additionally, therefore, a third command signal is developed requiring the carriage to be moved into the bottom compartment home position.

Since the computer is to control the entire system and particularly the processing of the cards in the respective magazines, it is necessary to signal to the computer whether or not any of the commands can be carried out. Reference is therefore being made to FIGURE 7 illustrating schematically a circuit network in the form of a block diagram including logic elements. This network illustrates how the inventive magazine selector apparatus decides whether or not it is capable of carrying out a particular command assigned by the computer.

There is first provided a general command signal input device 300 which provides for the suitable connection to a computer with which the inventive apparatus is to be cooperating. Three command lines 301, 302 and 303 leave the input device 300, and, as shown in FIGURE 7, a signal in command line 301 indicates that a "replace" command has been issued by the computer. A signal in the command line 302 indicates that a "fetch" command has been issued by the computer, and a signal in line 303 indicates that a "home" command has been issued by the computer.

There is next provided a top compartment content sensing device 310. This device is shown schematically as a block and it is to include a switching network. It will be recalled from a description of the carriage and particularly from the description of FIGURE 4 that switches 218 and 219 determine the status of the content of the top compartment. In particular, the two switches 218 and 219 are activated as an indication that there is a magazine in the top compartment. Therefore the output line 311 of device 310 is connected to receive a signal when switch 219 is off and switch 218 is on.

The switch 26 in a station 25 (FIGURE 1) is indicative whether or not a magazine is in the station. Therefore a line 312 in FIGURE 7 will receive a signal when switch 26 is activated for indicating that a magazine is in the station.

It will be recalled that the position of carriage 200 at any time is determined by a particular combination of piston displacement of the ten cylinder-piston arrangements outlined above with reference to FIGURE 2. It is, of course, apparent that by means of electrical sensing switches the status and position of every piston can be monitored and a particular combination of switching conditions is then indicative of the momentary position of the carriage. This will be described more fully below. For the moment it is sufficient to state that the carriage position sensing device 320 in FIGURE 7 gives signals that are indicative of the position of the carriage.

A detector 313 is connected to this carriage position sensing device 320. In particular, the detector 313 is a coincidence network which responds to one particular combination of position sensing switches indicating that in fact the bottom compartment 202 of the carriage is at home position. Thus, the output line 314 connected to detector 313 will receive an electrical signal whenever the bottom compartment of the carriage 200 is at home position.

These elements as described thus far with reference to FIGURE 7 are sufficient for the determination whether or not any one of the three command signals, "replace," "fetch" or "home" can be executed at a particular instant.

In the following there shall be described under what conditions the three commands can or cannot be executed. The logic network shown in FIGURE 7 is drawn primarily as a diagram indicating that certain status signals in response to issued command signals have to be developed, whereby the specific development, i.e., the implementation of the logic network is of minor importance. Logic networks can be implemented with electrical, electronic, electromechanical or other networks. Coincidence networks, switching devices with alternative path of energization, etc. are instrumental for practicing this portion of the inventive device and it is well within the scope of the ability of one skilled in the art to employ suitable switching devices as dictated by desired speed and reliability. Since the movement of the carriage is rather slow, no high speed electronic devices are necessary, and no specific reference is made to any specific implementation.

In determining the speed of operation, it should be mentioned that three magazines are usually involved as was already mentioned above. While the content of one magazine is processed, a second one is placed back into a cabinet compartment and a third magazine is fetched for replacing the first one after completion of processing. This third one does not have to arrive at the station for replacement until the processing of the first one is completed. Thus, the combined period of time it takes to return the second magazine and to subsequently fetch the third magazine does not have to exceed the shortest period of time of magazine processing in station 25; on the other hand, these combined periods of time should not take longer than such processing. The inventive device meets these conditions and can be implemented by electromechanical means.

Assuming that a "replace" command has been issued, an electrical signal is developed in command line 301. For executing a "replace" command it is conditional that the carriage is in the bottom compartment home position. If this is not true, the "replace" command cannot be executed, and a signal accordingly is to be issued and returned to the computer for the computer then to issue a "home" command. Therefore, the basic requirement for carrying out a "replace" command is whether or not the carriage 200 is in the bottom compartment home position. A logic "and" circuit 340 therefore has two input terminals to respond to the coincidence of the replace command signal coming through line 301 and to a signal developed by an inverter 341 which is connected to line 314. This inverter is a symbolic representation for the development of a signal when the bottom compartment is not home. Upon coincidence of a "replace" command signal in line 301 and at the absence of a signal by the BC home detector 313, a signal is returned to the computer by the "and" gate 340 and from there through an "or" gate 342 as an indication that the replace command cannot be executed.

In case, however, the carriage 200 is in the bottom compartment home position, an "and" gate 343 receives two input signals respectively from lines 314 and 301. However for responding the "and" circuit 343 requires an additional signal.

In one situation for executing the "replace" command it has to be found out whether a magazine is in fact in the station or not. If a magazine is in the station, the station content sensing device 36 issues a status signal into line 312, which is connected to the third input of the "and" circuit 343. Thus, in case of a three-input coincidence, "and" circuit 343 develops an output signal which is passed to an "or" circuit 344 for operating a switch. Throughout the execution of the replace command signal, an "execute replace" signal is developed in line 345. If desired, a special signalling may be had to inform the computer about and for the execution of the "replace" command.

Another situation exists if a magazine is in the station 26. In this case the "and" circuit 343 will not respond, but a "replace" command can still be executed provided the top compartment 201 of the carriage is full. If the top compartment 201 is not full, and if there is no magazine in the station 25 again the replace command cannot be executed. To signal this impossibility of executing the "replace" command to the computer, an "and"

network 346 is provided to respond to a coincidence of the following status signals.

First of all, the replace command has been issued and is running as a signal through line 301. Accordingly one input of a coincidence network 346 is connected to line 301. Next, it has to be sensed whether or not there is a magazine in the station 25. If a magazine is not in the station, a signal is needed here for this "and" coincidence circuit 346, and the development of this signal is symbolically represented by employment of an inverter 347 having its input line connected to the line 312. Thus, there will be a signal at the output side of inverters 347 whenever a magazine is not in the station 25. The next status signal for this situation comes from the top compartment sensing device 310. If the top compartment of the carriage is not full, no signal is developed in line 311, but since a signal is needed, the development of such a signal is symbolically represented by an inverter 348 having its input side connected to line 311 and its output side to the third input of the coincidence "and" gate 346.

Thus, in case of the situation just described an output signal is developed by "and" network 346 to be passed onto a second input of "or" circuit 342, and in this second situation again the impossibility of executing the "replace" command is signalled to the computer.

In case no magazine is in the station 25 but the top compartment 201 is in fact full, a concidence network 350 responds to this particular status situation. The "and" gate 350, therefore, has four inputs. One is connected to the replace command line 301. The output of inverter 347 furnishes a signal whenever there is no magazine in the station which, therefore, is the second input for the "and" circuit 350. The third input for coincidence network 350 is developed by the top compartment sensing device 310. Since a replace command shall be considered as being executable when a magazine is in the top compartment of the carriage, a signal in line 311 indicates and provides the third input for "and" circuit 350. The fourth input for "and" gate 350 is derived from the carriage position sensing device and particularly from the bottom compartment home position detector 313.

Whether or not the carriage is in home position is immaterial if no magazine is in the station and if no magazine is in the top compartment. Thus, the impossibility of executing the replace command can be signalled without monitoring the specific position of the carriage. So that coincidence network 346 is not connected to the detector 313.

Coincidence at the four input terminals of coincidence network 350 is an indication that in fact the "replace" command can be executed, even though there is no magazine in the station, and the corresponding command signal is passed through "or" circuit 344, and to a switch. The latter switch remains in the on state throughout execution of the replace command. The corresponding signal in line 345 serves as "executed replace command" signal.

The question whether or not a "fetch" command can be executed depends merely on the status of the top compartment. The "fetch" command, it will be recalled requires the carriage to be driven to a specific address, so that the magazine in the addressed cabinet compartment can be placed into the top compartment, and subsequently the top compartment will be driven home.

This "fetch" command cannot be executed in case the top compartment is not empty. The specific position of the carriage at the time the fetch command is issued is immaterial. Therefore, the impossibility of executing such command signal is monitored by an "and" circuit 351 having two inputs, one responding to a signal in fetch command line 302 and the other input side of coincidence network 351 is connected to the line 311 developing a signal when there is a magazine in the top compartment. In case this situation exists, the coincidence network 351 feeds a signal to the computer to indicate the fact that the "fetch" command cannot be executed.

Conversely, of course, an empty top compartment at the time a "fetch" command signal appears in line 302 is indicative of the fact that the "fetch" command can be executed. Therefore, there is provide an "and" circuit 352 which responds to coincidence of the "fetch" command signal appearing in line 302 and to a top compartment empty signal developed as a signal of corresponding polarity by the inverter 348. This, of course, is symbolic representation as was outlined above to indicate the fact that the "and" circuits 351 and 352 respond during a "fetch" command signal to complementary signals as developed by the top compartment content sensing device 310. The output of the coincidence network 352 is used to trigger a switch and an "execute fetch" signal is maintained in a line 353 throughout the fetch procedure.

The "home" command, i.e. the signal destined to cause the carriage to be moved into the home position (BC-home) shall be regarded as not executable if the top compartment is not empty. The reason for this is, that no magazine is to be transported towards the station which has not been fetched from a specific address. The home command usually is issued at the end of an operation so that after deactivation, the device is in a state of "BC-home."

Accordingly there is provided a coincidence network 354 responding to the issuance of a "home" command signal in line 303 and to a singal in line 311 indicative of the existence of a magazine in the top compartment. A coincidence of its two inputs coincidence network 354 returns a signal to the computer showing that the device cannot execute the "home" command.

Of course, the home command shall be considered executable if the top compartment is empty which is signalled by a signal at the output side of the inverter 348, and a coincidence network 355 will respond to the issuance of a "home" command in line 303 and to an output signal at inverter 348 which is indicative of an empty top compartment. The coincidence network 355 triggers a switch which in turn maintains an "execute home" signal in a line 356 throughout execution of the home command.

In summary, a signal in line 345 shall be regarded as a signal causing and accompanying the execution of a "replace" command. A signal in line 353 will be regarded as causing and accompanying the execution of a "fetch" command, and a signal in line 356 will be regarded as causing and accompanying the execution of a "home" command. The actual control for executing "replace," "fetch" and "home" command signals will now be described with reference to FIGURES 8 and 9.

The execution of the "fetch," "replace" and "home" commands requires certain conditions monitored by sensing devices issuing certain status signals. The execution of "replace" and "fetch" command signals, in particular, require predetermined sequences of operations, and any operational step has to be followed by another one. The sequence is not only predetermined but each step may require a particular combination of status signals, whereby certain status signals change during the sequence, and a certain step within a sequence can be carried out only after a certain status signal has changed. Thus, any operational step will result from a status change due to the completion of the preceding step.

Status signals are developed by the following devices, symbolically represented. First of all, there are provided the same sensing device introduced for the description of FIGURE 7. There is the top compartment content sensing device 310 which was outlined in detail above. In order to simplify illustration, this sensing device 310 is shown twice in FIGURE 8 at different locations. A signal in line 311 is to indicate that the top compartment is full, i.e., that a magazine is in proper position in the top compartment 201. If the top compartment is empty the inverter 348 provides an output accordingly.

As far as the bottom compartment is concerned, there is a sensing device 360 which in fact monitors the state of switches 226, 227 and 228 shown in FIGURE 5. A particular combination of on and off states of these switches indicates whether a magazine enters, is in, or leaves the bottom compartment or whether the bottom compartment is completely empty. Therefore, an inverter 361 is shown symbolically and the output of inverter 361 develops a signal whenever a magazine is not in the bottom compartment.

In FIGURE 8 there is shown further the station content sensing device which in fact is the switch 26 in station 25, and the line 312 is used here also for the transfer of a signal whenever a magazine is in the station; the absence of a signal in this line 312 shall be construed as indication that no magazine is in the processing station 25. In FIGURE 8 there is also shown the detector 313 developing a signal whenever the bottom compartment of the carriage is in home position. If the bottom compartment of the carriage 200 is not at home position no signal is developed in the line 314.

In an analogous manner there is provided another detector 362 monitoring also the carriage position sensing device 320, in order to determine whether or not the top compartment 201 of the carriage 200 is in home position. If this is true, a signal is developed in the output line 363 of detector 362. Additionally, FIGURE 8 shows symbolically the following elements which, in fact, have already been described more fully above.

There is a top compartment wheel drive which in fact is the motor 210 attached to the carriage 200. There is a top compartment linear drive which was also described above with reference to the linear actuator 211. It will be recalled that the linear drive is to be activated in order to pull a magazine out of a cabinet compartment, until the top compartment wheel drive and particularly the wheel rollers 108 and 117 (FIGURE 6) grip the magazine in order to load the top compartment 201 with the magazine.

FIGURE 8 also shows a schematic representation of the bottom compartment wheel drive which is the motor 209, and the bottom compartment linear drive 220 for pushing a magazine completely out of the bottom compartment and into a cabinet compartment. A block 365 includes the testing device for what is called the return address. As far as implementation is concerned this return address testing device 365 may be comprised of the photoelectric detector 230 as shown in FIGURE 6. The testing device may be tripped through a command signal in a line 376 causing lamp 229 to light up temporarily. Reflection or no reflection by a magazine is then monitored by the photoelectric detector 230 as indication of presence or absence of a magazine in the cabinet compartment when aligned within bottom compartment 202. The signal developed by this photoelectric detector 230 when activated is used to feed a command signal into a line 366 for indicating that the cabinet compartment positioned in front of the carriage bottom compartment is empty, so that in fact a magazine when in the bottom compartment of the carriage 200 can be pushed into the empty cabinet compartment.

The "fetch" command always requires that the computer issues signals which represent a particular address, i.e., a particular cabinet compartment must be designated from which a magazine is to be fetched. Also if at the time of a "replace" command a magazine is in the station 25, completion of this command requires that the computer issues also an address so that the magazine to be fetched from the station can be placed into that particularly addressed cabinet compartment.

It should be mentioned that usually a particular magazine will always be fetched from a particular address and later on the magazine must be returned to the same address. Therefore, as far as the computer is concerned the device can be modified in that the computer only issues an address during a fetch command, and such address is then passed into a storage device (not shown), to be called upon, if this particular magazine then has to be returned to the cabinet. This provision is particularly useful if the apparatus will be run over extended periods of time by alternating between fetch and replace commands. However, as far as operation of the inventive file selector is concerned, it is not necessary to elaborate this possibility of a single address issue type operation, and it can be implemented very easily. It is of importance only, that with each fetch command and with each replace command particular addresses are being issued, as is symbolically indicated in FIGURE 8 by line 370, and such addresses may always be issued by the computer. As was explained above with reference to Tables I and II, an address is defined by two rows respectively having four and five positions, so that for complete address transfer nine lines are necessary. Therefore, the line 370 is to be understood to comprise nine parallel lines to transfer nine bits, which plurality each represents an address. The relation between the address code and the resulting piston operation was described above with reference to FIGURES 1 and 2.

Signals in address select lines 370 may come from the computer or from a storage device or alternatingly from computer and storage device as desired. Since the address signals may be pulses of short duration, and since the address is not needed immediately upon issuance of a "fetch" or of a "replace" command signal, it is necessary to have a storage device available. Such storage device is denoted with reference number 371. An example for such storage device will be described later on with reference to FIGURE 9.

The content of address buffer 371 is passed to the carriage drive, symbolically denoted with reference numeral 372. The drive 372 includes all of the ten pistons and cylinders described above with reference to FIGURES 1 and 2. The transfer of data from buffer or storage device 371 to the carriage drive 372 for activation thereof, is controlled by a transfer device 382, which, upon actuation, effectively and operatively couples the storage device 371 to the drive 372.

The address storage device 371 may be governed by a gating device such as the gate or coincidence network 380. This gating device responds to the execution signals of the "fetch" command or of the "replace" command, which execution signals respectively appear in the line 353 and in the line 345 whenever it has been found that either the fetch or replace command can it fact be executed. It should be mentioned that, of course, the computer may issue a particular address at the same time it issues the command signals such as the fetch and the replace commands, but at that moment it is not clear whether or not the device can in fact execute this command. Therefore, the loading of the address words into the storage device 371 should be delayed until it is clear, that in fact a "fetch" or "replace" command can be executed. Thus, a signal either in line 345 or in line 353 is permitted to pass through logic "or" gate 381 for gating-open the gate 389 whereupon the address delivered from the computer can in fact be passed into the storage device 371.

The carriage drive 372 may, alternatively, be activated to drive the carriage into the bottom compartment home position. As far as command signals for the carriage drive 372 is concerned, this requires a particular combination of bits. It was mentioned above that top and bottom compartment home positions each are represented by specific addresses. These addresses are stored permanently and can be called up at any time if needed. The storage devices controlling the drive 372 for TC-home and BC-home operations are symbolically denoted with reference numerals 373 and 374. The implementation of these home addresses storage and drive control stages will also be described more fully below with reference to FIGURE 9.

A detector 375 is provided to determine whether the carriage 200 has arrived at the address selected by the storage device 371. Accordingly, network 375 is a coincidence network which compares the input combination of bits stored in the address storage 371 with the output furnished by carriage position sensing device 320 to determine whether in fact the carriage has reached the selected address.

The specific layout of this coincidence network does not require detailed elaboration. There are nine binary positions which defined an address, and there are nine pistons for controlling these positions. (There were ten, but it will be recalled that the cylinders with pistons 44 and 45 have to be regarded as unity.) The piston positions are monitored individually by nine monitoring devices, for example, sensing switches. The sum of nine individual comparisons between selected address and carriage position will reveal whether the carriage has reached the selected address. A portion of this detector 375 will be explained with reference to FIGURE 10. The coincidence device 375 issues a signal into its output line 376 whenever there is coincidence of signal resulting from the fact that the carriage has arrived at the position corresponding to the address stored in the device 371 and having been transferred therefrom to drive 372.

Finally blocks 27 and 28 respectively denote the magazine drive-in device and the magazine drive-out device, both at the station 25. It will be recalled that these devices are of importance only for completely pulling a magazine out of the top compartment 201 for placing it into proper position in the processing station 28, or for imparting an initial movement upon a magazine when in the station, until the wheels 155 and 142 (FIGURE 5) grip the magazine for driving it completely into the bottom compartment 202.

Before describing the logic network for the sequence control of executing the fetch and the replace command signals the implementation of several of the elements shown in FIGURE 8, and not previously outlined with reference to FIGURES 1 through 6, shall be described with reference to FIGURES 9 and 10.

In FIGURE 9, there is shown a network destined to vertically position the carriage 200 as controlled by bit signals issued from the computer. The position of the address representing the vertical carriage position is determined by the five position binary digits as shown in Table I. Therefore, this part of the address word or code will appear as bit combination in five address select lines 401, 402, 403, 404 and 405, which are five of altogether nine address select lines 370 shown in FIGURE 8.

A relay 406 has five contact governing the connection of these lines 401 through 405 to five address storing relays 411, 412, 413, 414 and 415. In fact this load relays 406 implements the symbolic gate 380 in FIGURE 8. The load relay 406 responds when either the executed fetch or the executed replace signal has been issued, whereupon in either one of these cases the relay 406 is energized to connect the five lines 401 through 405 to the load relays 411 through 415 for energization thereof.

The relays 411 through 415 constitute the storage cells for the address storage device 371 for storing the vertical positioning code. Energization of the storage relays 411 through 415, of course, is possible only during the absence of a clear command signal, i.e., the relay 407 for clearing the storage relays must not be energized.

In order to more fully illustrate this storage device, for example, an address to be selected may be located in the row identified by the code 00010 (see the Table I). Now a signal will appear in line 402 only for energizing relay 412, while relay 411 and relays 413 through 415 remain unenergized.

The carriage 200 actually is positioned by control action of solenoids respectively affecting the various cylinders 61 etc. For example, there is shown cylinders 61 producing the smallest stroke equal to one-half the height of one cabinet compartment. The cylinder 61 has its specific piston rod 60 attached to a frame 59 carrying two of the movable pulleys 54 and 58 for positioning belt 50 as was described with reference to FIGURE 12.

The cylinder 61 is provided with two inlets for fluid under pressure, which two inlets are respectively governed by the valves, 416 and 417. These valves are opened or closed in an alternating mode thereby connecting a source of fluid under pressure 418 to one or the other of the two inlets of cylinder 61 for adjusting and controlling the position of the piston rod 60.

The valves 416 and 417 are respectively controlled by two solenoids 421 and 431. The solenoid 421 can be energized, provided relay 411 of the storage device 371 was not energized. An alternative device for energizing the solenoid 421 will be described more fully below. The other solenoid 431 can be energized provided relay 411 was in fact energized.

For controlling the other cylinders 62 to 65 for the vertical positioning of the carriage 200, there are respectively provided pairs of solenoids 422–432, 423–433, 424–434 and 425–435. These solenoids control similar valves admitting pressure from the source under pressure 418 to one side or the other side of the pistons in the respective cylinders. These valves such as 416, 417 are the type that in case either solenoid is deenergized, the piston in cylinder 61 retains its position. Sensing switches 441 and 451 respectively monitor the position of the piston and piston rod. The two switches will be open only during position changes, otherwise, always one or the other of the two switches is closed. Relays 461 and 471 are respectively governed by these sensing switches. Sensing switches 443 to 445 and 452 to 455, and relays 462 to 465 and 472 to 475 cooperate respectively with the other drives 62 to 65 in an analogous manner.

Mere loading of the storage device 371, i.e., energization of one or more of the relays 411 through 415 will not by itself cause any energization of the solenoids 421 through 425 and 431 through 435.

Energization proper of one or more solenoids 421 through 425 and one or more of solenoids 431 through 435 is attained by the transfer command relay 408 which in effect is the simple implementation of the transfer stage 382 of FIGURE 8. The relay 408 will be energized during the execution of a fetch or of replace command, and it will be described more fully below, that during a particular phase of the operation the address stored in the relays such as 411, etc. will be transferred to the carriage drive.

The driving of the carriage to their TC or BC home address is independent from any address delivered from the computer to the storage device 371, and it was mentioned above with reference to FIGURE 8, that the home addresses for bottom and top compartments are stored in special storage devices 373 and 375. These special storage devices can be implemented by simple relay connections. As far as vertical position is concerned, the top compartment home address code is 01001. In order to drive the carriage to this address, solenoids 431, 422, 423, 434 and 425 must be reenergized.

Accordingly, there is provided a switching device which establishes energization circuits for just these solenoids. A relay 426 has five blades for connecting the aforementioned five solenoids to ground for energization thereof independent from any addresses stored in the relays 411 through 415, and independent from the position of the transfer command signal 408. Looking again at Table II one can see that the bottom compartment home address so far as vertical position is convened differs from the top compartment home address by a change in the energization of the smallest stroke solenoid which is governed by the cylinder 61. Accordingly, if the carriage 200 is to be driven to the bottom compartment home address the relay 426 will also be energized but additionally a relay 427 is energized which in effect negates the energization for solenoid 431 and instead energizes the solenoid 421. Thus, for a bottom compartment home address, solenoids 421, 422, 434 and 425 are being energized. These two relays 426 and 427 are being used as a simple implementation for BC and TC home address storage and command devices 373 and 374.

For the horizontal drive the layout is very similar and here the top compartment and bottom compartment home addresses have the same code as far as horizontal position is concerned so that the relay 426 may be provided with additional blades to govern the solenoids respectively controlling the cylinders 41 through 45.

Also, the transfer command relay 408, the load command relay 406 and the clear command relay 407 will be povided with additional contacts to be effective in input and output circuits for the storage relays that are analogous to the relays 411 through 415 and for controlling the horizontal drive.

In FIGURES 10 and 11 there is shown how the respective arrival of the carriage at a selected address, the BC home and the TC home position can be signaled.

The storage relays 411, 412, etc. are equipped with one additional blade each, respectively denoted with reference numerals 411a, 412a, etc. which when energized selectively provide a series circuit connection with additional contact blades of piston position sensing relays. Thus, when relay 411 is energized its blade 411a connects in series with a blade 471a when closed. Closed contacts of blade 471a mean that cylinder 61 has completed its positioning of belt 50. When relay 411 is not energized, its blade 411a connects in series with a blade 461a which when closed signals opposite positioning of cylinder 61. The combination of positions of blades 411a, 412a, etc. defines the desired position of the carriage as representation of the address input device of comparator 375 in FIGURE 8. The blades 461a, 471a, 462a, 472a, etc. represent the carriage position sensing device 320, and the series circuit connection illustrated in FIGURE 10 is instrumental for the comparator 375, comprising address input and carriage position. The relay 375a responds when the carriage 200 has arrived at the selected address, which is signalled into line 376 (FIGURE 8).

The position sensing relay 462, 463, 474 and 465 each have an additional contact identified by suffix-*b* and defining a series of circuit connection for signalling the arrival of the carriage in BC or TC-home (FIGURE 11). These blades can be construed as common components for detectors 313 and 362, since the BC and TC home addresses differ only by one vertical positioning unit. The BC and TC home addresses differ in that for BC home sensing 461 responds and a blade 461*b* provides for the distributing circuit connection to energize a signalling relay 313a when the carriage 200 is in BC-home. As long as the carriage is not in BC-home, relay 313a is energized. Correspondingly, a blade 471*b* closes when the carriage is in TC-home and a relay 362a responds when a TC-home positioning is completed.

Now the logic necessary for carrying out command sequences for execution of the "fetch" and "replace" commands shall be described with reference to FIGURE 8. As soon as the "fetch" command from the computer is being received and the device has been found in a condition that a fetch command can be executed, the fetch command executing signal appears in the line 353. Of course, the fetch command is accompanied by an address instruction appearing in the nine lines of connection 370. The address is stored immediately in the storage device 371 which means that relays of type 411 through 415 as shown in FIGURE 9 respond to store the address.

However, it was mentioned that the carriage drive in relation to the address input is wired that a particular address used to drive the carriage, will place the bottom compartment 202 of carriage 200 into alignment with the cabinet compartment that is respectively associated to this particular address. The fetch command however requires the top compartment to be aligned to a particular cabinet compartment for fetching therefrom a magazine if there is any. Accordingly, the computer is wired that for the fetch command signal the address delivered concurrently into the line 370 for storage in the store device 371 and for later evaluation is not identical with the address of the fetch address but represents the address of the cabinet compartment below. In this case, the top compartment will in fact be made alignable with the desired address, while the carriage drive 372 drives the bottom compartment to the address which is one cabinet compartment below the desired address.

The first step of executing the fetch command requires the driving of the carriage to this address as defined. Accordingly, within the sequence control a coincidence device 501 responds to proper and completed storage of the address by storage device 371, and the coincidence signal derived from network 501 triggers the transfer device 382 for causing the content of the address storage device 371 to be transferred to the carriage drive 372.

In terms of the network shown in FIGURE 9 this means that relay 408 is caused to respond to the completion of the response of relays such as 411 through 415, and to the fetch executing signal from line 353.

Now the carriage 200 is being driven through the solenoids and the various cylinders, piston drives, belts, etc. as outlined with reference to FIGURES 1, 2 and 9, until the carriage arrives at the selected address, in which the top compartment 201 of carriage 200 is in alignment with the selected cabinet compartment.

The stored address is also transferred to the monitoring device or comparator 375. This comparator responds to a complete coincidence of the stored address, and of the carriage position as sensed by device 320. Upon complete coincidence an indication is produced to signal that the carriage has arrived at the selected address (response of relay 375a in FIGURE 11). This signal is fed into the line 376.

Now the next step to be carried out is the pulling out of the magazine from the cabinet compartment and into the top compartment of the carriage. This requires two steps, first the linear drive 211 has to be initiated. It is advisable, however, to make the initiation of the linear drive 211 responsive to a signal which is indicative of the fact that the top compartment 201 of the carriage is in fact empty. From a sequence and logic standpoint this provision might be considered redundant because it will be recalled that the fetch executing signal in line 353 was produced only if the top compartment was in fact empty at the time the command signal was delivered from the computer. Thus, to render the linear drive 211 responsive to an empty top compartment condition is merely an additional safeguard.

Accordingly, there is provided a coincidence network 502, such as a multiple input relay, which responds to a top compartment empty signal which, as will be recalled, was derivable from the top compartment content sensing device 310 through the inverter 348. Next, it is of course advisable to render the response of the top compartment linear drive 211 dependent upon the existence of the fetching executing command signal in the line 353, so that the network 502 is indeed connected thereto. Additionally, the top compartment linear drive must not be executed until the carriage has arrived in the selected address so that a third input for the coincidence network 502 is connected to the line 376 producing a signal when the carriage has in fact arrived at the selected address.

Upon the coincidence of these three signals the motor 211 of the linear drive is being energized directly to pull a magazine out of the addressed cabinet compartment. It will be recalled from the description of FIGURE 4, that the sensing switch 219 on the carriage, which is part of the BC-content sensing device 360, now should respond at only a slight delay after the top compartment linear drive 211 has been energized, provided a magazine is in fact in the addressed cabinet compartment. Therefore, there is provided a signaling device 505 which may be comprised of a delay relay responding also to the output of the coincidence network 502 and signaling at a delay thereafter that the addressed cabinet compartment was empty. However this signaling device will be interrupted by actuation of the switch 219 provided this response occurs within the delay selected by the delay device. The delay of course is dimensioned to be sure that if the cabinet compartment does contain a magazine, no signal will be produced.

The coincidence network 502, of course, does also trigger the top compartment wheel drive 210. This triggering is effective only after response of switch 219 through a gate 506 actuating drive 210. As soon as the magazine is pulled out of the cabinet compartment and is completely positioned in the top compartment 201, a particular combination of switch actuation of switches 218 and 219 on the carriage 200 prevails, whereupon this top compartment sensing or content detector 310 changes its state and coincidence is removed from the networks 502 and 506, and the two drives 210 and 211 stop indeed. In addition there may be provided a brake which ensures positive stopping to prevent an overshooting so that the magazine will not be pushed out of the top compartment 201 on the other side thereof.

Now, the system has assumed a status or condition in which the top compartment 201 is full for the first time after issuance of the "fetch" command. Since a magazine now is in the top compartment, the first portion of the fetch command has been executed. The next sub-routine as part of the fetch command execution is to drive the bottom compartment to home. Accordingly, there is provided a coincidence network 503 which responds to the top compartment full condition during the fetch command executing cycle, i.e. coincidence network 503 is connected directly to the device 310 and to the line 353 to produce an output and command signal to the home address storing control device 373.

In terms of the relay network shown in FIGURES 4 and 9, this means that during the fetch operating cycle relays 426 and 427 respond to a particular combination of switching states of switches 218 and 219 in the carriage, whereupon immediately the carriage is being driven to the bottom compartment home position.

The end of the fetch sequence is signalled by the arrival of the bottom compartment at the home address. Accordingly, there is an end-of-operation indicating device 504 which is prepared for response by the fetch command executing signal in line 353. The output of the bottom compartment home position detecting device 313 furnishes the outer input for signalling gate 504. The end of operation signal, here derivable from the coincidence network 504, can be used further to erase the address previously stored from the buffer 371, i.e. the output of network 504 may issue a clear command signal to cause, for example, relay 407 in FIGURE 9 to respond, whereupon the initial stage of preparedness is restored.

Next the execution of a "home" signal is to be described. It will be recalled that the home executing signal in line 356 was dependent on an empty top compartment. Assuming that this was the case, a signal in line 356 is simply being used directly to trigger the home address storage and drive control device 373, i.e., to trigger relays such as relay 426 and 427 in FIGURE 9, whereupon the carriage drive 372 is being activated to drive the carriage to BC-home. The arrival of the carriage at BC-home is signaled by an output in line 314, and the end of home operation, which may include again a clearing operation, is signalled by a conincidence device 511 responding to the home executing signal in line 356 and to a signal in line 314.

The first step of executing the "replace" command depends on the condition of the station content sensing switch 26. Assuming that no magazine is in the processing station 25, then the inverter 347 provides a signal; the top compartment content sensing device 310 produces a signal in line 311, and the replace command executing signal in line 345 now together with the two other signals produces a response of coincidence or "and" circuit 521. This concidence signal is used to trigger the TC-home address storage and drive control device 374, which in the example shown in FIGURE 9 would be the relay 426. The carriage drive 372 is energized to place the carriage 200 in the TC home position so that the top compartment of the carriage 200 is aligned with the station 25.

Upon arrival at this top compartment home position the detector 362 produces an output signal in line 363. The next desired step is the driving of the magazine in the top compartment 201 into the station 25. The arrival of the top compartment in its home position is signalled by detector 362 which, therefore has its output line 363 connected to a coincidence network 522.

This network 522 is prepared for response by the replace command executing signal in line 345, and by the top compartment-full-signal in line 311. The coincidence output signal of network 522 is used to trigger both the top compartment wheel drive 210 and the station drive-in drive 27. The subsequent removal of the magazine from the top compartment causes the two coincidence network 521 and 522 to be deactivated. As far as the station drive-in drive 27 is concerned, it may be self-interrupting in that once it is activated it will be turned off by the station content sensing switch 26 when the magazine has arrived and is properly positioned at the processing station 25.

The proper placement of the magazine in the processing station 25 results in a signal in line 312. Since this magazine was drawn from the top compartment, this compartment is now empty so that a signal results from inverter 348; the replace command executing signal in line 345 is used to prepare a coincidence network 523 now responding to the new state as signalled by the inverter 348, by station sensing switch 26 and by bottom compartment content sensing switch 360. The output signal of network 523 passes through an "or" circuit 524 to signal the end of the replace sequence in this particular instant. This signalling of the end of operation is inhibited if the bottom compartment of the carriage is full to prevent production of an output by network 523 during different portions of the replace execution sequence, when there is a temporary situation: TC-empty, station full, but this situation does not always identify the end of operation, because a magazine when in the bottom compartment has to be disposed of.

Assuming that a magazine is in the station at the time the replace command signal appears in line 345, then the coincidence network 521 will not respond, but instead a coincidence network 525 will respond. This coincidence network 525 is prepared for such a response by a signal derived from inverter 361 indicating that the bottom compartment is empty, and it will further, of course, respond to a replace command executing signal in line 345. A fourth input is fed to the network 525 to make sure that the coincidence network 525 will respond only when the carriage is in BC home position. Through this is a condition for furnishing the execute "replace" signal, it must be avoided that during a different phase of operation a condition BC-empty, station full causes network 525 to respond.

The output of coincidence network 525 is fed to the station drive-out drive 28 and to the bottom compartment wheel drive 209 causing the magazine then in the station 25 to be driven into the bottom compartment. Naturally, upon proper positioning of the magazine in the bottom compartment the circuit 525 will cease to respond.

The next step within this sequence depends upon the status of the top compartment. Assuming the top compartment is full, then the "and" circuit 521 will respond, because the station content indicating switch 26 has reversed its state when the magazine in the station was driven into the bottom compartment so that coincidence is established for network 521. Again, the carriage is being driven to the top compartment home address. Upon arrival, the circuit 522 responds to coincidence in view of the fact that now the top compartment home address detector 362 issues a signal into line 363, and a coincidence occurs at the input side of the coincidence network 422 as aforedescribed. Again, the magazine in the top compartment is being driven into the station by response of the top compartment motor 210 and of the station drive 27 for drive-in.

If the top compartment was not full at the time the replace command signal was issued, or if a magazine previously in the top compartment has been driven by the top compartment wheel drive into the station, a situation prevails in which the bottom compartment 201 contains a magazine while the top compartment 202 does not contain a magazine. Ever since the issuance of the replace command signal this is now the first time that this particular situation occurs, and it is used as a particular indication together with a replace command executing signal in line 345. This particular condition is used to cause the carriage to be driven to the address, which at the same time the replace command signal was issued, has passed into lines 370 and buffer 371. Accordingly, there is provided a coincidence network 526 responding to the TC-empty, BC-full situation and producing a trigger signal to the transfer address command station 382. The replacement address previously stored in buffer 371 upon occurrence of the replace command executing signal in line 345 is now transferred to the carriage drive 372, and the carriage 200 is driven to the replacement address.

Upon arrival of the carriage at the replacement address a test is conducted whether the cabinet compartment so addressed is in fact empty. It will be recalled that the photoelectric receiver 230 together with electric lamp 229 is mounted in front of the bottom compartment to monitor whether or not the respectively juxtaposed cabinet compartment is full or is empty. Preferably the arrival of the carriage at the replacement address in this instance is used to initiate the test by the testing device 365. The output line 376 of comparator 375 feeds a gate 529 prepared by the replacement executing signal in line 345 so that the test be conducted only during the replacement cycle. A signal in line 366, which is the output of photodetector 230, or the absence of such signal respectively indicate that the cabinet compartment so tested is empty or is full.

Assuming that the addressed and tested cabinet compartment is empty, then the position of the carriage at the proper address together with the successful test result causes a coincidence network 527 to respond and to trigger the bottom compartment wheel drive 209, as well as the bottom compartment linear drive 220, to first move the magazine from the bottom compartment of the carriage partially out of the bottom compartment, and to subsequently push this magazine completely into the addressed cabinet compartment. The empty bottom compartment causes inverter 361 to produce an output which is combined with the output of comparator 376 at a coincidence network 528 to respond and to produce a signal to be passed through the "or" circuit 524 signalling the end of the replacement operation.

As far as the execution of the replace command signal is concerned, it will be understood that it is a sequence in which a magazine may be placed into the station and which is controlled by the two coincidence networks 521 and 522 responding sequentially. This may be initiated immediately upon occurrence of the replace command executing signal in line 345 to be completed only if the bottom compartment at that time is not full, so that an end of the replace operation can be signalled by coincidence circuit 523 subsequent to the response of coincidence circuit 522.

In this particular subsequence the networks 525, 526 and 527 do not respond. Therefore, in order to avoid any overlap of operation it is possible to have the circuits 525, 526 and 527 blocked for as long as either one or both of the networks 521 and 522 respond.

The situation for carrying out the replace sequence is different if a magazine initially is in the station to be withdrawn therefrom. In this case the circuit 521 is inhibited initially from responding. The sequence of response is then dependent on the state of the top compartment; if it is empty, then the sequence of response is 525, 526, 527 and 528, whereby the magazine is removed from the station and placed into the replacement address. The full sequence of exchanging magazines will be carried out only when both, station and top compartment contain magazines and then the control sequence is 525, 521, 522, 526, 527, 528.

A refinement of the device takes under consideration that BC and TC addresses are also to cabinet compartment addresses. Therefore blocking gates can be provided suppressing any output of detectors 313 and 362 if comparator 375 produces an output.

The invention is not limited to the embodiments described above, but all changes and modifications thereof not constituting departures from the spirit and scope of the invention are intended to be covered by the following claims.

What is claimed is:

1. A document retrieving apparatus for placing selected magazines containing documents into a processing station and for removing such magazines therefrom, comprising:
   a plurality of stationary compartments, each compartment being open for access, and being adapted to house a magazine containing documents;
   a carriage having two compartments each having dimensions to receive one such magazine;
   means for individually aligning each of said carriage compartments with any of said cabinet compartments and with the processing station; and
   means on said carriage for selectively driving a magazine into and out of either one of said carriage compartments.

2. A document retrieving apparatus for placing selected magazines containing documents into a processing station and for removing such magazines therefrom, comprising:
   a plurality of compartments adapted to house magazines containing documents, the magazines in said compartments being removably positionable therein;
   a carriage having compartments of such dimensions to receive such magazines;
   magazine transport means on said carriage for driving magazines into and out of said carriage compartments; and
   a carriage drive being operable independently and concurrently in two directions for selectively positioning said carriage compartments relative to any of said cabinet compartments and to said processing station; and control means for the magazine transport between carriage compartments and cabinet compartments and between carriage compartments and processing station operating in dependence upon positioning by the carriage drive.

3. A document retrieving apparatus for placing selected magazines containing documents into a processing station and removing such magazines therefrom, comprising:
   a plurality of substantially similar shaped compartments arranged in an array to define a cabinet, each compartment being open on one side, the open sides of said compartments defining a common operating plane, each of said compartments adapted to house one magazine containing documents and being positionable into a compartment through said operating plane;

a carriage having two compartments each having dimensions to receive one such magazine, each compartment of the carriage being open on both sides, and each carriage compartment being individually alignable with any cabinet compartment;

a matrix drive for selectively positioning any of said carriage compartments into alignment with any of said cabinet compartments and with said processing station;

means for monitoring the region in front of either one of said carriage compartments holding a magazine; and means governed by the result as provided by said monitoring means for moving a magazine when in said one carriage compartment into the region as aligning with said one carriage compartment when said region is empty.

4. A document retrieving apparatus for placing selected magazines containing documents into a processing station and removing such magazines therefrom, comprising:

a plurality of substantially similarly shaped compartments arranged in an array to define a cabinet, each compartment being open on one side, the open sides of said compartments defining a common operating plane, each of said compartments adapted to house one magazine containing documents and being positionable into a compartment through said operating plane;

a carriage having two compartments each having dimensions to receive one such magazine, each compartment of the carriage being open on both sides, and each carriage compartment being individually alignable with any cabinet compartment and facing with one of its sides the operating plane, each carriage compartment alignable with its respective other side with the station;

first drive means in the carriage establishing a first direction of movement in a first one of said carriage compartments, for intermittently moving a magazine out of a cabinet compartment and into said station;

second drive means in the carriage establishing a second direction of movement in the second one of said carriage compartments for intermittently moving a magazine out of said station and into a cabinet compartment;

external drive means for selectively postioning said compartments of said carriage into alignment with any of said cabinet compartments, and said station; and means for providing to said external drive means sequences of control signals identifying sequences of alignment positions of the carriage compartments.

5. A document retrieving apparatus for placing selected magazines containing documents into a processing station and removing such magazines therefrom, comprising:

a plurality of substantially similarly shaped compartments arranged in an array to define a cabinet, each compartment being open on one side, the open side of said compartments defining a common operating plane, each of said compartments adapted to house one magazine containing documents and being positionable into a compartment through said operating plane;

a carriage having two compartments each having dimensions to receive one such magazine, each compartment of the carriage being open on both sides, and each carriage compartment being individually alignable with any cabinet compartment;

a matrix drive for selectively positioning any of said carriage compartments into alignment with any of said cabinet compartments and with said processing station;

first wheel drive means in said carriage for moving a magazine in said first compartment in a direction away from said operating plane;

a linear drive on said carriage for pulling a magazine in a cabinet compartment aligned with said first compartment into said first compartment;

second wheel drive means in said carriage for moving a magazine in said second compartment in a direction towards said operating plane;

and a second linear drive in said carriage for pushing a magazine into an empty cabinet compartment aligned with said second compartment.

6. A document retrieving apparatus for placing selected magazines containing documents into a processing station and removing such magazines therefrom, comprising:

a plurality of substantially similarly shaped compartments arranged in an array to define a cabinet, each compartment being open on one side, the open sides of said compartments defining a common operating plane, each of said compartments adapted to house one magazine containing documents and being positionable into a compartment through said operating plane;

a carriage having two compartments each having dimensions to receive one such magazine, each compartment of the carriage being open on both sides, and each carriage compartment being individually alignable with any cabinet compartment;

first control means for moving said carriage from a position of carriage compartment alignment with a selected cabinet compartment to a position of carriage alignment with said station and vice versa;

and second control means for selectively placing an empty carriage compartment into station alignment when a magazine is in the station, and for selectively placing a carriage compartment containing a magazine into station alignment when said station is empty.

7. A document retrieving apparatus for placing selected magazines containing documents into a processing station, and removing such magazines therefrom, comprising:

a plurality of substantially similarly shaped compartments arranged in an array to define a cabinet, each compartment being open on one side, the open sides of said compartments defining a common operating plane, each of said compartments adapted to house one magazine containing documents and being positionable into a compartment through said operating plane;

a carriage having first and second compartments, each having dimensions to receive one such magazine, said first and second compartments being open on both sides and being individually alignable with a cabinet compartment;

a matrix drive moving in increments of cabinet compartment height and width for selectively positioning any of said carriage compartments into alignment with any of said cabinet compartments and with said processing station;

means for driving magazines into and out of said carriage compartments; and program control means operating upon said matrix drive and said magazine driving means, for driving a magazine positioned in said processing station into said first carriage compartment for aligning the second carriage compartment with the station and for subsequently driving a magazine positioned in the second carriage compartment into the processing station.

8. A document retrieving apparatus for placing selected magazines containing documents into a processing station and removing such magazines therefrom, comprising:
- a plurality of substantially similarly shaped compartments arranged in an array to define a cabinet, said compartments being open on one side, the open sides of said compartments defining a common operating plane, each of said compartments adapted to house one magazine containing documents and being positionable into a compartment through said operating plane;
- a carriage having two compartments each having dimensions to receive one such magazine, each compartment of the carriage being open on both sides, and each carriage compartment being individually alignable with any cabinet compartment;
- a matrix drive for selectively positioning any of said carriage compartments into alignment with any of said cabinet compartments and with said processing station;
- program control means for first placing one of said carriage compartments into alignment with said station and for subsequently placing the other carriage compartment into alignment with said station;
- first magazine drive means for driving a magazine out of said station and into said one carriage compartment when said one carriage compartment is in alignment with said station; and
- second magazine driving means for driving the magazine in said other carriage compartment into said station when said other carriage compartment is in alignment with said station.

9. A document retrieving apparatus for placing selected magazines containing documents into a processing station and removing such magazines therefrom, comprising:
- a plurality of substantially similarly shaped compartments arranged in an array to define a cabinet, each compartment being open on one side, the open sides of said compartments defining a common operating plane, each of said compartments adapted to house one magazine containing documents and being positionable into a compartment through said operating plane;
- a carriage having first and second compartments each having dimensions to receive one such magazine, the said first and second compartments being open on both ends and each being individually alignable with a cabinet compartment;
- operating means for positioning said first carriage compartment into alignment with a cabinet compartment containing a magazine;
- means for driving said magazine into said first carriage compartment;
- means cooperating with said operating means for moving said carriage permitting alignment of its compartments with said station;
- means for exchanging a second magazine then positioned in the station for said first-mentioned magazine by loading said first magazine into said second carriage compartment and ejecting said first magazine into said station;
- and means for changing the alignment of said carriage compartment in between loading and ejecting of said magazines.

10. A document retrieving apparatus for placing selected magazine containing documents into a processing station and removing such magazines therefrom, comprising:
- a plurality of substantially similarly shaped compartments arranged in an array to define a cabinet, each compartment being open on one side, the open side of said compartment defining a common operating plane, each of said compartments adapted to house one magazine containing documents and being positionable into a compartment through said operating plane;
- a carriage having two compartments each having dimensions to receive one such magazine, each compartment of the carriage being open on both sides, and each carriage compartment being individually alignable with any cabinet compartment;
- a first plurality of positioning elements for moving said carriage in a first direction along said cabinet compartments, each positioning element independently imparting on said carriage a movement for a fixed distance, the sum of the distances over which all of said elements move said carriage respectively determining the position of said carriage in said first direction; and
- a second plurality of positioning elements for moving said carriage in the orthogonal direction along said cabinet compartments independently from the movement imparted upon said carriage by said first plurality of positioning elements, each positioning element of said second plurality of elements independently imparting upon the carriage a movement for a fixed distance, the sum of distances over which said second plurality of elements move said carriage respectively determining the position of said carriage in said orthogonal direction.

11. A document retrieval apparatus for placing selected magazines containing documents into a processing station, comprising:
- a plurality of similarly shaped compartments arranged in rows and columns defining a matrix, each compartment having a width extending in a first direction along the direction of extension of the matrix rows, each compartment having a height extending in a second direction and along the direction of extension of the matrix column, each compartment further adapted to house a magazine, and having an open end at a common operating plane;
- a carriage having first and second compartments respectively alignable with any of said matrix compartments, each carriage compartment being open on both ends;
- means on said carriage for driving magazines into and out of each of its two compartments; and
- a first and second plurality of linear actuators coupled to said carriage, each actuator capable of assuming either one of two stationary positions thereby moving said carriage by a predetermined distance, said first linear actuator moving said carriage in said first direction and in steps of compartment widths and said second linear actuator moving said carriage in said second direction and in steps of compartment height.

12. A document retrieving apparatus for placing selected magazines containing documents into a processing station and for removing such magazines therefrom, comprising:
- a plurality of substantially similarly shaped compartments, each compartment being open on one side, said compartments being arranged for access through said open sides, each of said compartments adapted to house one magazine containing documents;
- a carriage having two compartments each being open on opposite sides and having dimensions to receive one such magazine;
- first means in the carriage for intermittently driving a magazine from a cabinet compartment through the open side of the first carriage compartment, when facing the cabinet compartment, into the first carriage compartment, and through its other open side into the station;
- second means in the carriage for intermittently driving a magazine from the station through the open side of the second carriage compartment when facing the station, into the second carriage compartment, and through its opposite open side into a cabinet compartment when facing the second carriage compartment; and drive means for alternating alignment as between the first and second carriage compartment with the station or a cabinet compartment and the station.

13. A document retrieving apparatus for placing selected magazines containing documents into a processing station and for removing such magazine therefrom, comprising:

a plurality of substantially similarly shaped compartments, each compartment being open on one side, said compartments being arranged for access through said open sides, each of said compartments adapted to house one magazine containing documents;

a carriage having first and second compartments, each having dimensions to receive one such magazine, said first and second compartments each being open on both sides and being individually alignable with a cabinet compartment;

means driving said carriage into selective alignment of its compartment with cabinet compartments and with said station;

first program control means for operating said driving means for selective alignment of the second carriage compartment with a cabinet compartment, and for subsequently aligning the first carriage compartment with the station;

second program control means operating said driving means for driving said carriage so that sequentially said second carriage compartment is aligned with the station and the first carriage compartment is aligned with a selected one of said cabinet compartments; and third program control means for operating said driving means on the carriage for transporting a magazine as between a carriage compartment and the station or a cabinet compartment in response to attained alignment as controlled by the first and second program control means.

14. A document retrieving apparatus for placing selected magazines containing documents into a processing station and for removing such magazines therefrom, comprising:

a plurality of substantially similarly shaped compartments each compartment being open on one side, said compartment being arranged for access through said open sides, each of said compartments adapted to house one magazine containing documents;

a carriage having first and second open compartments each having dimensions to receive one such magazine;

means on said carriage for selectively driving a magazine into and out of either one of said carriage compartments;

carriage drive means for selectively positioning either of said carriage compartments into alignment with any of said cabinet compartments, and said station;

means for providing signals identifying the respective positions of the carriage compartments in relation to a cabinet compartment, and including first and second signals particularly identifying respective alignment of the first and second compartments with the station; control means for said drive means responsive to said signals for operating the drive means to drive the carriage into a position as identified by the signals as provided;

first program control means for first causing the providing of said first signals for said control means, for said drive means to place said first carriage compartment into alignment with said station and for subsequently causing the providing of said second signals for said control means, for said drive means to place the second carriage compartment into alignment with said station; and second program control means for causing said magazine drive means to drive a magazine out of said station and into said first carriage compartment when said first carriage compartment is in alignment with said station, and for cauisng said magazine drive means to drive a magazine when in said second carriage compartment into said station when said second carriage compartment is in alignment with said station.

15. A document retrieving apparatus for placing selected magazines containing documents into a processing station and for removing such magazines therefrom, comprising:

a plurality of compartments adapted to house magazines containing documents, the magazines in said compartments being removably positioned therein;

a carriage having compartments, each having dimensions to receive one such magazine;

a matrix drive for selectively positioning either of the carriage compartments in alignment with either of the compartments of the plurality or with the station;

means for driving a magazine into or out of either of the carriage compartments; and first program control means operating said matrix drive and said magazine drive for loading a magazine from a compartment of the plurality into a first one of the carriage compartments and placing a second one of the carriage compartments into alignment with the station;

second program control means for operating said matrix drive and said magazine drive for loading a magazine from the station into the second carriage compartment, for aligning the first carriage compartment with the station and for driving the magazine in the first carriage compartment into the station; and third program control means for operating the matrix drive and said magazine drive for aligning the second carriage compartment with a selected compartment of the plurality and driving the magazine in the second carriage compartment into the selected compartment.

16. A document retrieving apparatus for placing selected magazines containing documents into a processing station and removing such magazines therefrom, comprising:

a plurality of substantially similarly shaped compartments arranged in an array to define a cabinet, each compartment being open on one side, the open sides of said compartments defining a common operating plane, each of said compartment adapted to house one magazine containing documents and being positionable into a compartment through said operating plane;

a carriage having first and second compartments each having dimensions to receive one such magazine, each compartment of the carriage being open for access, and being individually alignable with any cabinet compartment, and with said processing station;

a matrix drive moving in increments of cabinet compartment height and width for selectively positioning any of said carriage compartments into alignment with any of said cabinet compartments and with said processing station;

control means responsive to signals identifying desired positions of said carriage compartments in relation to the cabinet compartment and to the station for controlling said matrix drive, the signals including first and second signals identifying the positions of the first and second carriage compartments when in alignment with the station;

means for providing to said control means sequentially said second and first signals for sequentially aligning the two carriage compartments with the station for an exchange of magazines in the station; and means for receiving externally provided signals for causing said control means to control said matrix drive for moving said carriage into alignment of with one of said cabinet compartments in accordance with the received signals, for fetching or returning a magazine to the cabinet compartment.

17. A document retrieving apparatus for placing selected magazines containing documents into a processing station and removing such magazine therefrom, comprising:

a plurality of substantially similarly shaped compartments arranged in an array to define a cabinet, each compartment being open on one side, the open side of said compartments defining a common operating plane, each of said compartments adapted to house one magazine containing documents and being positionable into a compartment through said operating plane;

a carriage having two compartments each having dimensions to receive one such magazine, each compartment of the carriage being open on both sides, and each carriage compartment being individually alignable with either of the cabinet compartments, and with the station;

a matrix drive for selectively positioning any of said carriage compartments into alignment with any of said cabinet compartments and with said processing station;

means for providing sequences of control signals, each sequence including at least two of first, second and third control signals, the first and second control signal respectively representing alignment of the two carriage compartments with the station, the third control signal representing alignment of a carriage compartment with a cabinet compartment;

control means responsive to said sequences for operating the matrix drive to move the carriage sequentially into the positions as defined by the control signals of a sequence as provided; and means for selectively moving magazines into and out of said carriage compartments in dependence upon the respective position of a carriage compartment.

18. A document retrieving apparatus for placing selected magazines containing documents into a processing station and removing such magazines therefrom, comprising:

a plurality of substantially similarly shaped compartments arranged in an array to define a cabinet, each compartment being open on one side, the open sides of said compartments defining a common operating plane, each of said compartments adapted to house one magazine containing documents and being positionable into a compartment through said operating plane;

a carriage having first and second compartments each having dimensions to receive one such magazine, each compartment of the carriage being open for access, and being individually alignable with any cabinet compartment, and with said processing station;

a matrix drive moving in increments of cabinet compartment height and width for selectively positioning any of said carriage compartments into alignment with any of said cabinet compartments and with said processing station;

means for driving magazines respectively into and out of said first and second carriage compartments;

means for providing first and second signals respectively identifying alignment of the first and second carriage compartments with the station; and control means for first providing the first signal to the matrix drive to align the first carriage compartment with the station, for operating the magazine drive means to drive a magazine from the station into the first carriage compartment, for subsequently providing the second signal to the matrix drive to align the second carriage compartment with the station and to operate the magazine drive means to drive a magazine from the second carriage compartment in the station.

19. A document retrieving apparatus for placing selected magazine containing documents into a processing station and removing such magazines therefrom, comprising:

a plurality of substantially similarly shaped compartments arranged in an array to define a cabinet, each compartment being open on one side, the open sides of said compartments defining a common operating plane, each of said compartments adapted to house one magazine containing documents and being positionable into a compartment through said operating plane;

a carriage having first and second compartments each having dimensions to receive one such magazine, each compartment of the carriage being open for access, and being individually alignable with any cabinet compartment, and with said processing station;

a matrix drive for moving the carriage independently and concurrently in two orthogonal directions for selective alignment between either carriage compartment and either cabinet compartment and the station;

means for selectively driving magazines into and out carriage compartments to thereby selectively place magazines out of and into the station or selectively out of and into a cabinet compartment when aligned with one of the carriage compartments;

first program means for controlling the matrix drive for driving the carriage for alternating alignments of the two carriage compartments, on one hand and selectively with the station and with a cabinet compartment and the station; and second program means for controlling the magazine drive means for a carriage compartment in response to established alignment of the latter carriage compartment with the station or a cabinet compartment.

20. A document retrieving apparatus for placing selected magazines containing documents into a processing station and removing such magazines therefrom, comprising:

a plurality of substantially similarly shaped compartments arranged in an array to define a cabinet, each compartment being open on one side, the open sides of said compartments defining a common operating plane, each of said compartments adapted to house one magazine containing documents and being positionable into a compartment through said operating plane;

a carriage having first and second compartments each having dimensions to receive one such magazine, each compartment of the carriage being open for access, and being individually alignable with an cabinet compartment, and with said processing station;

means for receiving control signals respectively identifying the position of the carriage in relation to the compartments and being representative of selective alignment of either carriage compartment and either cabinet compartment;

means ford providing first and second control signals respectively identifying the position of the first and second carriage compartment in alignment with the station;

drive means responsive to the control signals as received or provided to drive the carriage into alignment of its compartments, and wtih cabinet compartments or the station; and program control means responsive to the control signals as received and providing sequences as between a control signal as received and at least one of the first and second control signals as provided, to control the drive means to alternate between alignment of the first carriage compartment and of the second carriage compartment with the station or a cabinet compartment.

References Cited by the Examiner

UNITED STATES PATENTS

| | | | |
|---|---|---|---|
| 2,229,776 | 1/1941 | Steinhorn | 214—16.1 |
| 2,386,520 | 10/1945 | Watson et al. | 312—223 |
| 2,696,921 | 12/1954 | Desjardins | 214—16.1 |
| 2,707,666 | 5/1955 | Becker | 312—319 |
| 2,941,738 | 6/1960 | Burke et al. | 242—55.12 |

CLAUDE A. LE ROY, *Primary Examiner.*

CHANCELLOR E. HARRIS, *Examiner.*

F. DOMOTOR, *Assistant Examiner.*